(12) United States Patent
Djadi et al.

(10) Patent No.: US 11,979,659 B2
(45) Date of Patent: May 7, 2024

(54) MULTI-CHIP CAMERA CONTROLLER SYSTEM WITH INTER-CHIP COMMUNICATION

(71) Applicant: Cirrus Logic International Semiconductor Ltd., Edinburgh (GB)

(72) Inventors: Younes Djadi, Austin, TX (US); Nariankadu D. Hemkumar, Austin, TX (US); Sachin Deo, Austin, TX (US); Daniel T. Bogard, Austin, TX (US); Nathan Daniel Pozniak Buchanan, Austin, TX (US); Eric B. Smith, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 221 days.

(21) Appl. No.: 17/737,615

(22) Filed: May 5, 2022

(65) Prior Publication Data

US 2022/0329725 A1 Oct. 13, 2022

Related U.S. Application Data

(63) Continuation-in-part of application No. 17/320,528, filed on May 14, 2021.
(Continued)

(51) Int. Cl.
*H04N 23/661* (2023.01)
*G01D 5/14* (2006.01)
(Continued)

(52) U.S. Cl.
CPC .......... *H04N 23/661* (2023.01); *G01D 5/145* (2013.01); *G03B 13/36* (2013.01); *H04N 23/66* (2023.01);
(Continued)

(58) Field of Classification Search
CPC .... H04N 23/661; H04N 23/66; H04N 23/662; H04N 23/665; H04N 23/687;
(Continued)

(56) References Cited

U.S. PATENT DOCUMENTS

| 4,599,719 A | 7/1986 | Breen et al. |
| 7,358,809 B2 | 4/2008 | Elder |

(Continued)

OTHER PUBLICATIONS

Ray, Sourja et al. "A 13-b Linear, 40-MS/s Pipelined ADS with Self-Configured Capacitor Matching." IEEE Journal of Solid-State Circuits, vol. 42, No. 3, Mar. 2007. pp. 463-474.

*Primary Examiner* — Abdelaaziz Tissire
(74) *Attorney, Agent, or Firm* — E. Alan Davis; Huffman Law Group PC

(57) ABSTRACT

A system for using actuators to control an image sensor and/or lens based on sensor data received from position sensors and position information for the image sensor and/or lens received from a host processor includes a primary camera controller device, at least one secondary camera controller device, and at least one communication link connecting the primary camera controller device and the secondary camera controller device. The primary camera controller device processes the received sensor data and the received position information to generate control data, sends a secondary portion of the control data to the secondary camera controller device via the communication link, and drives a primary portion of the control data to the actuators. The secondary camera controller device drives the received secondary portion of the control data to the actuators concurrently with the primary camera controller device driving the primary portion of the control data to the actuators.

24 Claims, 30 Drawing Sheets

Related U.S. Application Data

(60) Provisional application No. 63/186,022, filed on May 7, 2021, provisional application No. 63/024,735, filed on May 14, 2020.

(51) Int. Cl.
  *G03B 13/36* (2021.01)
  *H04N 23/60* (2023.01)
  *H04N 23/66* (2023.01)

(52) U.S. Cl.
  CPC ......... *H04N 23/662* (2023.01); *H04N 23/665* (2023.01)

(58) Field of Classification Search
  CPC .. H04N 23/6812; H04N 23/68; H04N 3/1562; H04N 23/67; G01D 5/145; G03B 13/36; H02K 33/00
  See application file for complete search history.

(56) References Cited

U.S. PATENT DOCUMENTS

| | | |
|---|---|---|
| 9,735,736 B2 | 8/2017 | Kusuda |
| 9,859,907 B1 | 1/2018 | Li |
| 9,876,518 B2 | 1/2018 | Kim et al. |
| 10,382,687 B1* | 8/2019 | Patel ................... G02B 27/646 |
| 10,396,724 B1 | 8/2019 | Daigle et al. |
| 11,228,291 B2 | 1/2022 | Kusuda |
| 11,412,141 B2* | 8/2022 | Kim ................... H04N 23/6812 |
| 11,621,683 B2 | 4/2023 | Xu et al. |
| 2006/0016966 A1* | 1/2006 | Hughes ................ G03B 15/006 250/221 |
| 2007/0050582 A1 | 3/2007 | Mangione-Smith |
| 2008/0240301 A1 | 10/2008 | Mandal et al. |
| 2010/0019842 A1 | 1/2010 | Larson et al. |
| 2010/0290769 A1* | 11/2010 | Nasiri .................... G03B 17/00 396/55 |
| 2011/0063146 A1 | 3/2011 | Matthews et al. |
| 2012/0063756 A1* | 3/2012 | Kang .................. H04N 23/687 396/55 |
| 2012/0096290 A1 | 4/2012 | Shkolnikov et al. |
| 2014/0077873 A1 | 3/2014 | Motz et al. |
| 2014/0079098 A1 | 3/2014 | Harjani et al. |
| 2014/0225591 A1 | 8/2014 | Knierim et al. |
| 2015/0134862 A1 | 5/2015 | Sthoeger et al. |
| 2015/0319365 A1 | 11/2015 | Lloyd et al. |
| 2018/0076780 A1 | 3/2018 | Wang et al. |
| 2018/0270424 A1* | 9/2018 | Li ........................ H04N 17/002 |
| 2020/0120283 A1* | 4/2020 | Min ...................... H04N 23/55 |
| 2020/0307832 A1 | 10/2020 | Wichowski et al. |
| 2020/0393529 A1 | 12/2020 | Larson et al. |
| 2021/0029319 A1 | 1/2021 | McFarland et al. |
| 2021/0096389 A1 | 4/2021 | Kim |
| 2021/0143835 A1 | 5/2021 | Gonzalez et al. |
| 2021/0305955 A1 | 9/2021 | Ozalevli |
| 2021/0321039 A1 | 10/2021 | Kim et al. |
| 2021/0356843 A1 | 11/2021 | Deo et al. |
| 2022/0190789 A1 | 6/2022 | Zanbaghi et al. |
| 2022/0190794 A1 | 6/2022 | Schneider et al. |
| 2023/0117027 A1 | 4/2023 | Fang et al. |
| 2023/0209189 A1 | 6/2023 | Feng |

\* cited by examiner

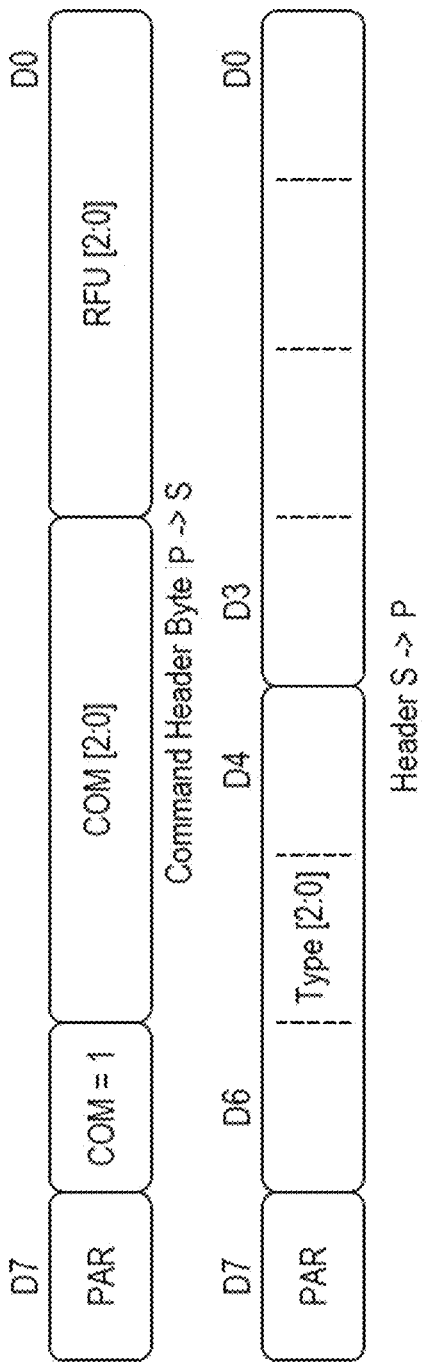
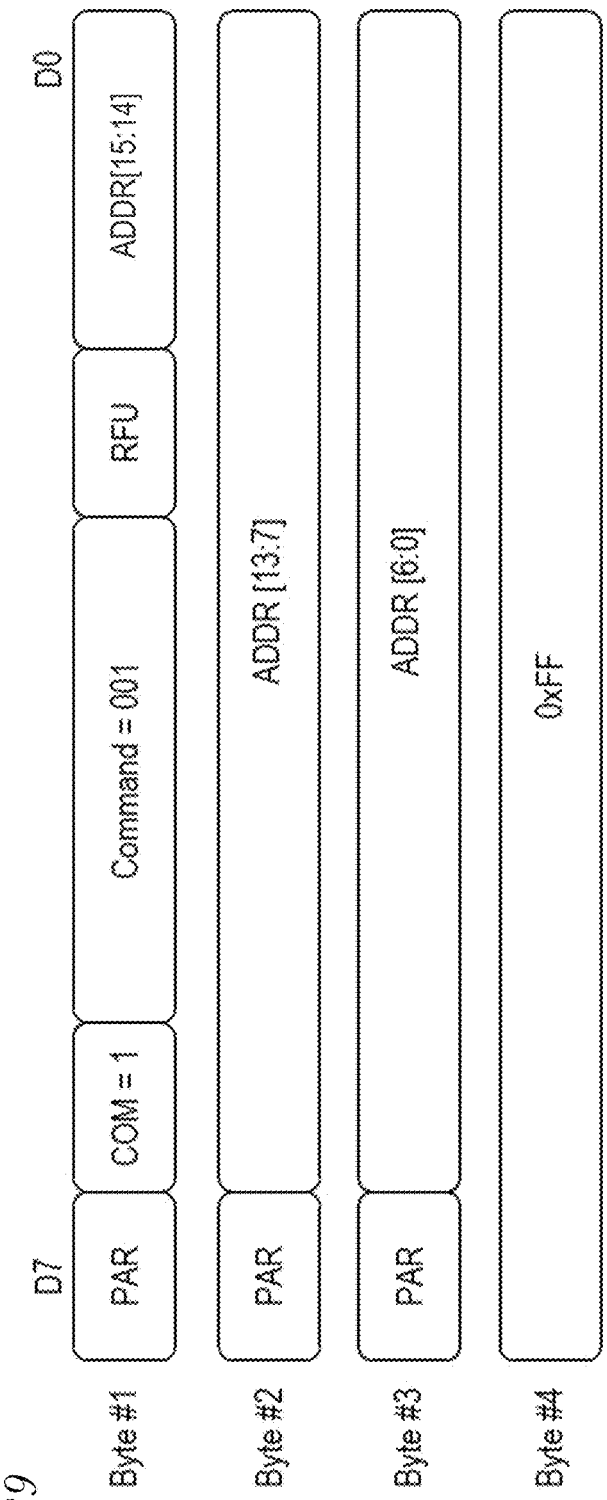
FIG. 27
FIG. 28
FIG. 29

MULTI-CHIP CAMERA CONTROLLER SYSTEM WITH INTER-CHIP COMMUNICATION

CROSS REFERENCE TO RELATED APPLICATION(S)

This application is a continuation-in-part of U.S. Non-Provisional application Ser. No. 17/320,528, filed May 14, 2021, which claims priority based on U.S. Provisional Application, Ser. No. 63/024,735, filed May 14, 2020 and claims priority based on U.S. Provisional Application Ser. No. 63/186,022, filed May 7, 2021, each of which is hereby incorporated by reference in its entirety, and this application claims priority based on U.S. Provisional Application Ser. No. 63/186,022, filed May 7, 2021.

BACKGROUND

Camera controllers are used to control and drive a camera (e.g., camera lenses and parts), and such controllers and cameras are used in applications such as smart phones, tablets, and computers. Such a controller or device needs to obtain and process data from the camera lenses and parts. The accurate and efficient delivery and management of data (e.g., datastreams and sub-streams) between the camera controllers and the camera are very important. An example of the delivery and management of such data is provided by U.S. patent application Ser. No. 16/522,580 entitled "FLEXIBLE LATENCY-MINIMIZED DELIVERY AND MANAGEMENT OF DISPARATE-RATE DATA STREAMS AND SUB-STREAMS FOR PROCESSING" filed on 25 Jul. 2018 to inventors James McFarland, Nariankadu Hemkumar, Sachin Deo, and Younes Djadi (hereafter referred to as the "580 Patent Application"), published as U.S. Patent Application Publication 2021/0029319 on Jan. 28, 2021. The 580 Patent Application is hereby incorporated by reference in its entirety.

SUMMARY

Embodiments of the present disclosure describe a communication link connecting two or more devices in a camera controller system. The camera controller system includes two or more camera controller devices that receive sensor data from sensors and that control actuators, e.g., voice coil motors. The camera controller system also includes a communication link connecting the primary device to the secondary devices. The communication link may operate in half-duplex mode or full-duplex mode. A host processor is in communication with the camera controller system. A camera module may include the camera controller system, an image sensor, the actuators that position the image sensor, and the sensors that sense position data of the image sensor.

The communication link supports synchronous and time critical operation. The communication link may include a clockless interface that includes a single wire in a half-duplex configuration, or two wires in a full-duplex configuration. The communication link transfers voice coil motor (VCM) data and sensor data between the primary and secondary devices. The communication link transfers control and status information from the primary device to the secondary device. The communication link transfers sensor data and status information from the secondary device to the primary device. The communication link enables the primary device to access memories and registers of the secondary device. The communication link may detect a single bit error in idle and active modes. The data transfer on the communication link is triggered by the host processor in an open loop mode or by the device digital signal processor (DSP) frame in a closed loop mode. The communication link may be used to synchronize sensor data capture and VCM driver data application between the primary and secondary devices. On the transmit side, a flush byte (e.g., 0xFF) may be appended at the end of a packet to indicate to the receiver the completion of packet transmission. On the receive side, the receiver state machine resynchronizes upon detection of a parity error, which may happen when the flush byte is detected or if a bit flips due to an external noise source. The secondary device DSP frame may be synchronized to the primary device DSP frame.

Embodiments of the present disclosure may be extended to more than two devices.

In one embodiment, the present disclosure provides a system for using actuators to control an image sensor and/or lens based on sensor data received from position sensors and based on position information for the image sensor and/or lens received from a host processor. The system includes a primary camera controller device, at least one secondary camera controller device, and at least one communication link connecting the primary camera controller device and the at least one secondary camera controller device. The primary camera controller device is configured to process the received sensor data and the received position information to generate control data, send a secondary portion of the control data to the secondary camera controller device via the communication link, and drive a primary portion of the control data to the actuators. The secondary camera controller device is configured to drive the received secondary portion of the control data to the actuators concurrently with the primary camera controller device driving the primary portion of the control data to the actuators.

In another embodiment, the present disclosure provides a method for using actuators to control an image sensor and/or lens based on sensor data received from position sensors and based on position information for the image sensor and/or lens received from a host processor. The method includes processing, by a primary camera controller device, the received sensor data and the received position information to generate control data. The method also includes sending, by the primary camera controller device, a secondary portion of the control data to at least one secondary camera controller device via at least one communication link connecting the primary camera controller device and the at least one secondary camera controller device. The method also includes driving, by the primary camera controller device, a primary portion of the control data to the actuators. The method also includes driving, by the secondary camera controller device, the received secondary portion of the control data to the actuators concurrently with the primary camera controller device driving the primary portion of the control data to the actuators.

BRIEF DESCRIPTION OF THE DRAWINGS

FIG. 27 is an example block diagram illustrating a primary to secondary command packet header in accordance with embodiments of the present disclosure.

FIG. 28 is an example block diagram illustrating a secondary to primary response packet header in accordance with embodiments of the present disclosure.

FIG. 29 is an example block diagram illustrating a primary to secondary 16-bit register read command packet in accordance with embodiments of the present disclosure.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
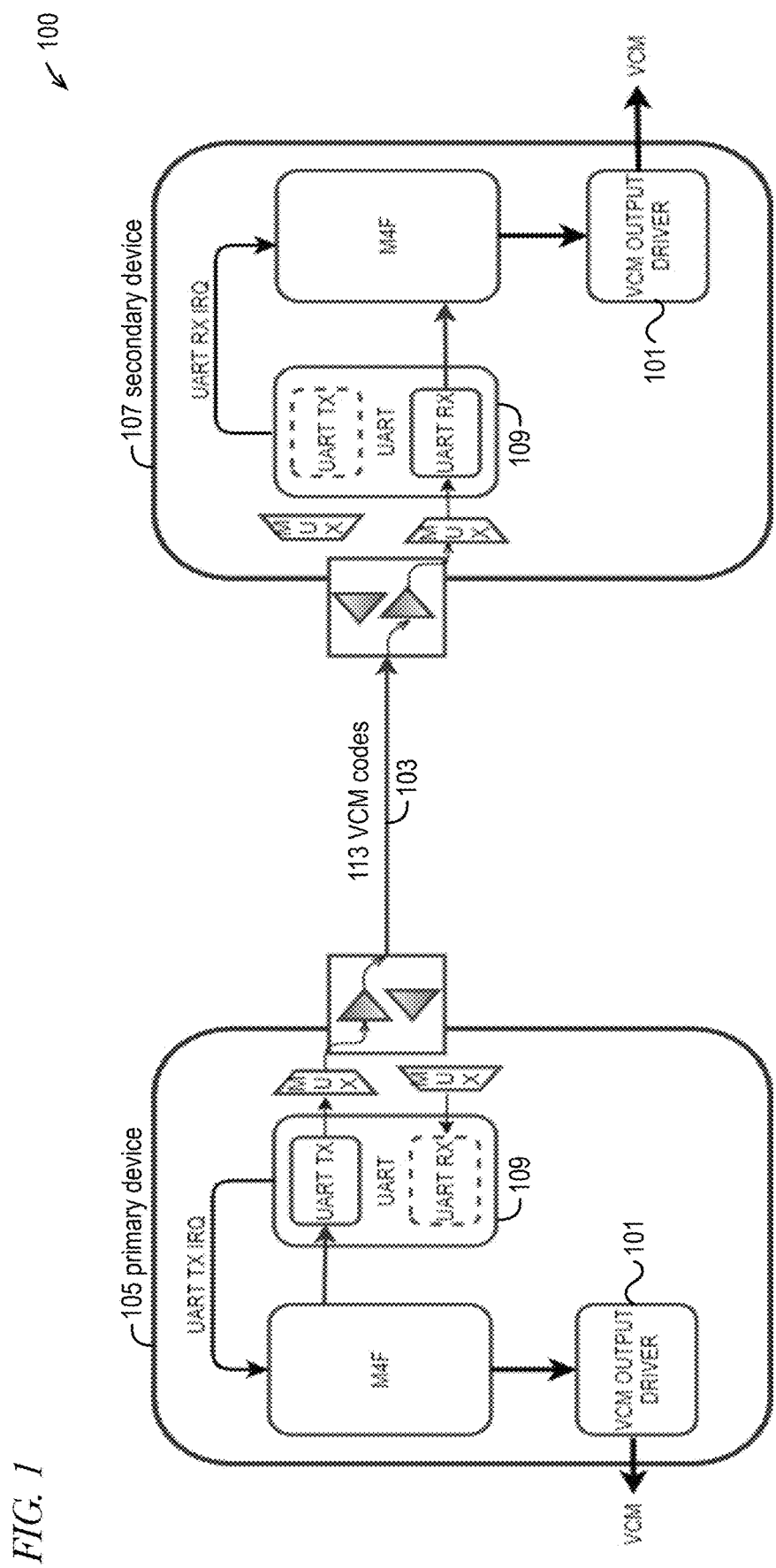
FIG. 1 is an example system of primary and secondary devices in communication with one another to provide an increased number of synchronized outputs in accordance with embodiments of the present disclosure.

In certain camera control systems, there is a need to extend one or more voice coil motor (VCM) driver outputs using a secondary device 107 of FIG. 1 that operates in tandem and in tight synchronization with a primary device 105 of FIG. 1. A Universal Asynchronous Receiver/Transmitter (UART) and Event Timer based method and system are disclosed to achieve such synchronization. This method and system accommodate both major states of operation—open-loop mode and closed-loop mode.

A viable option for extending the VCM output driver channels beyond the number of supported channels on a single device, including but not limited to a camera controller, is to connect two devices (e.g., two camera controllers) in primary/secondary configuration communicating VCM codes 113 of FIG. 1 over UART 109 of FIG. 1. In general, the primary and secondary devices operate asynchronously with respect to each other. Therefore, it is not practical to have two devices configured and controlled for identical processing to achieve duplication of one or more VCM Driver outputs 101 of FIG. 1, while also ensuring tight synchronization of the same. In order to achieve tight synchronization and duplication, a method and system must be developed, whereby only the primary device does the processing (e.g., by processor M4F of FIG. 1), and the secondary device mirrors the desired output(s).

The primary/secondary output skew is defined to be the time duration between VCM code(s) application on the primary and secondary devices. The desire is to minimize the output skew between the primary device and the secondary device, as well as to minimize the VCM code application latency post processing on both the primary and secondary devices. In addition, it is highly desirable to have VCM code transmission (from the primary device) and reception (on the secondary device) to be non-blocking (neither entity is required to wait on the other for transmission and/or reception). Finally, the method and system should be efficient to minimally impact processing capabilities on the primary device and/or the secondary device.

The system 100 and method shown in FIG. 1 and in accordance with the present disclosure duplicates one VCM driver output 101 from the primary device 105 onto the secondary device 107. However, the system and method may also be used to duplicate all of the primary device's VCM driver outputs 101, constrained only by the speed of the UART communication link 103, excess processing capability, and time duration between computation of VCM codes 103 and the desired application latency on the VCM drivers 101.

The system and method below provide four (4) VCM outputs: two (2) OIS (Optical Image Stabilization)+one (1) AF (Auto-Focus) on the primary device, and one (1) AF on the secondary device. The AF VCM output driver on the secondary device duplicates AF VCM output driver on the primary device. The specific realization of the method described below allows for synchronized update of both the primary and secondary AF VCM driver outputs in both open-loop and closed-loop modes of operation with an output skew of less than 20 μs. The same system may also be devised to provide two (2) OIS VCM outputs on the primary device and two (2) AF VCM outputs on the secondary device. In general, many configurations are possible including swapping of OIS and AF VCM outputs on the primary and secondary devices as described above.

An example embodiment of the present disclosure is provided and organized in detail as follows: software framework, VCM Code packet structure to ensure basic minimum integrity, UART Transmit driver on the primary device, UART Receive driver on the secondary device and run-time execution context of UART communication in open-loop and closed-loop modes of operation and mode switching thereof.

Software Framework

Figure 2:
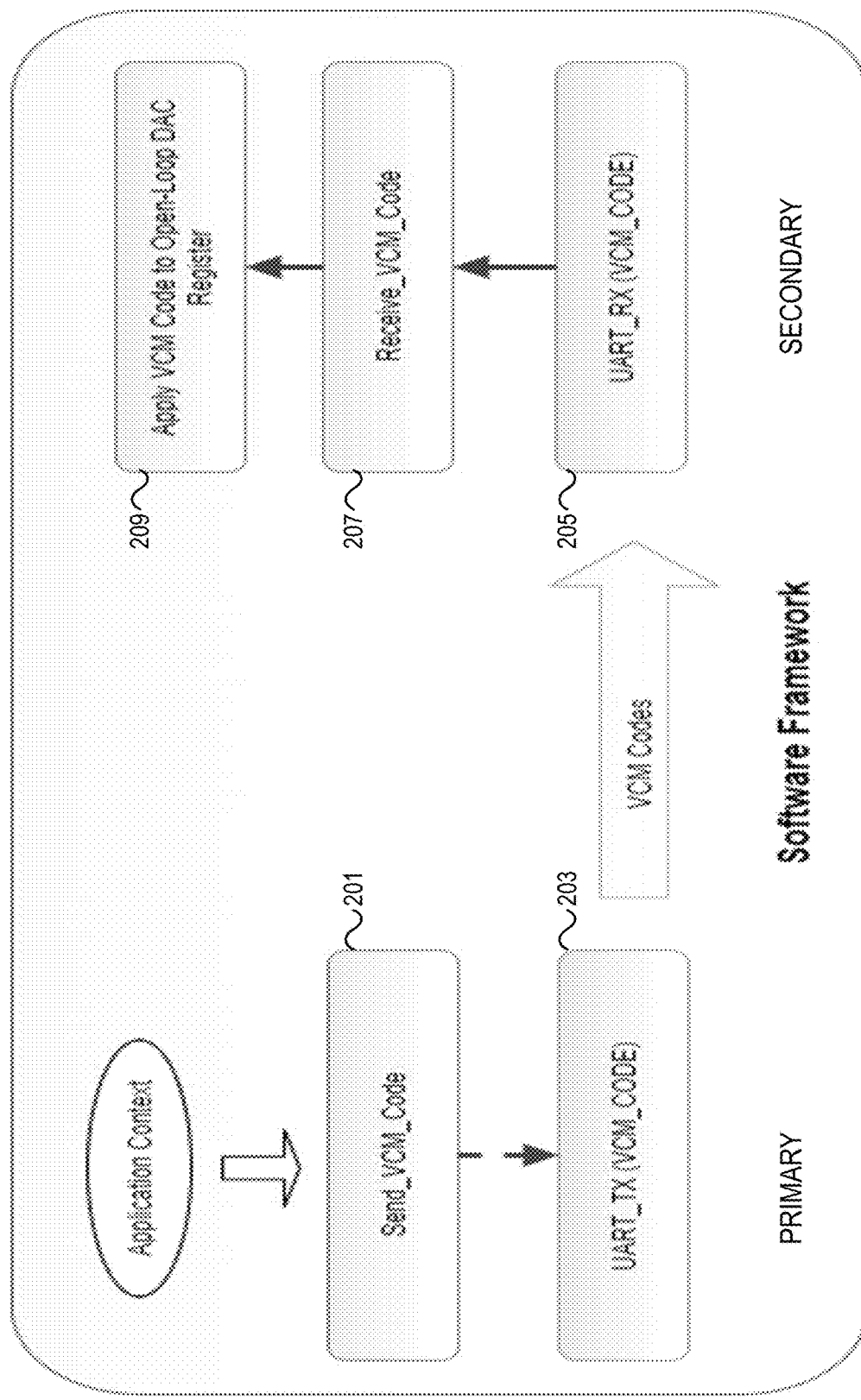
FIG. 2 is an example firmware driver framework on the primary device and the secondary devices of FIG. 1 in accordance with embodiments of the present disclosure.

Firmware driver framework on the primary device and the secondary device is outlined in the diagram shown as FIG. 2. The primary device transmits VCM codes (blocks 201 and 203) in one of the two system states—closed-loop mode or open-loop mode over UART. The secondary device receives VCM codes (blocks 205 and 207) and applies them to the open-loop digital-to-analog converter (DAC) register (block 209). While the primary device may be in the open-loop mode or closed-loop mode of operation, the secondary device always operates in the open-loop mode.

VCM Packet Structure

Figure 3:
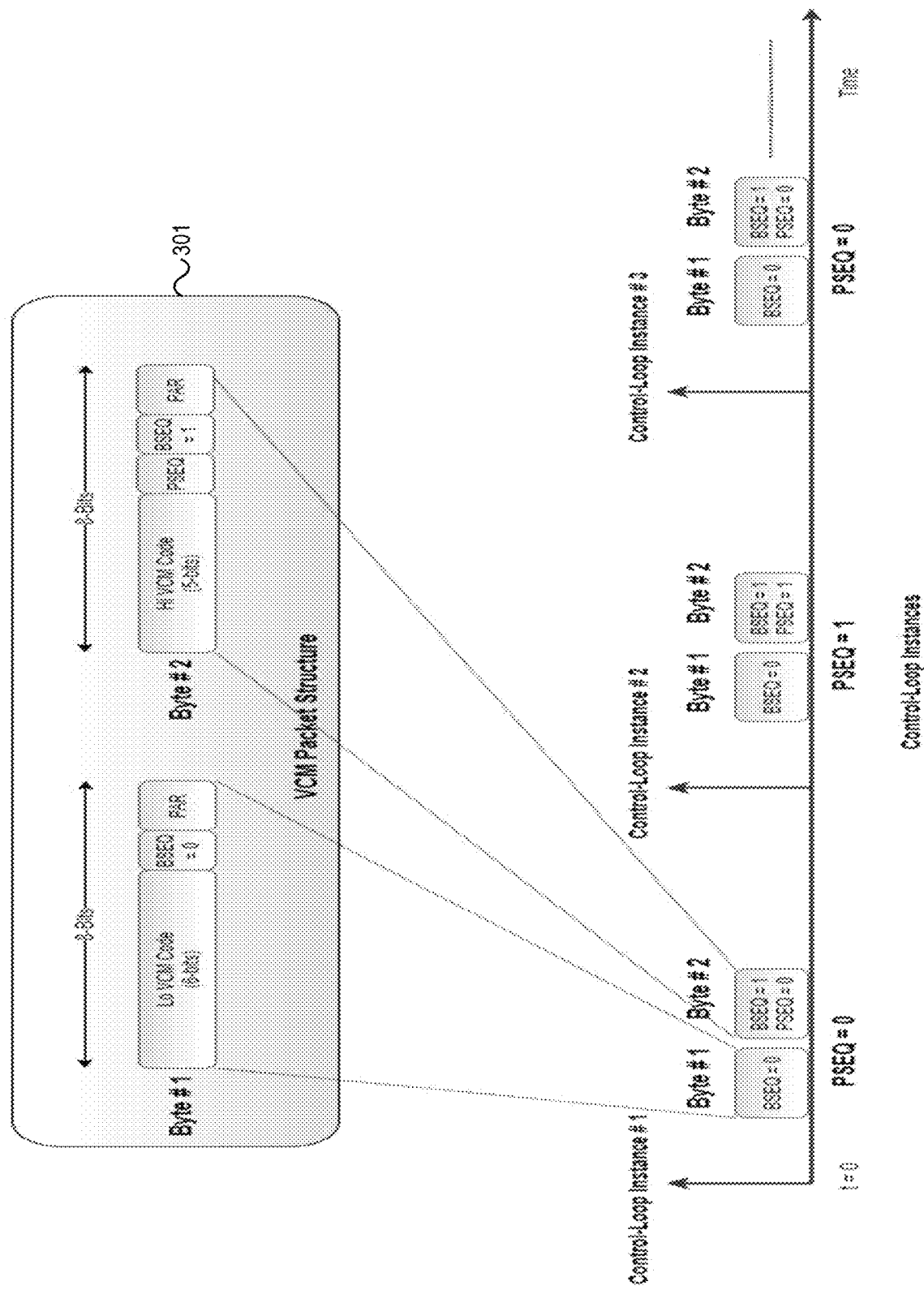
FIG. 3 is an example Universal Asynchronous Receiver Transmitter (UART) packet structure for transmission between the primary and secondary devices of FIG. 1 in accordance with embodiments of the present disclosure.

Each eleven (11)-bit AF VCM current DAC (IDAC) code is sent over a UART packet. A two (2)-byte packet structure 301 to ensure basic integrity of sequence, data, and packet is shown in FIG. 3. Parity bit (PAR) checks data integrity by indicating odd parity of bits, Byte sequence bit (BSEQ) identifies correct byte order within a packet, and the Packet sequence bit (PSEQ) identifies alternate (odd/even) packets as a check on the expected packet sequence versus received packet sequence.

UART Receive Driver

Figure 4:
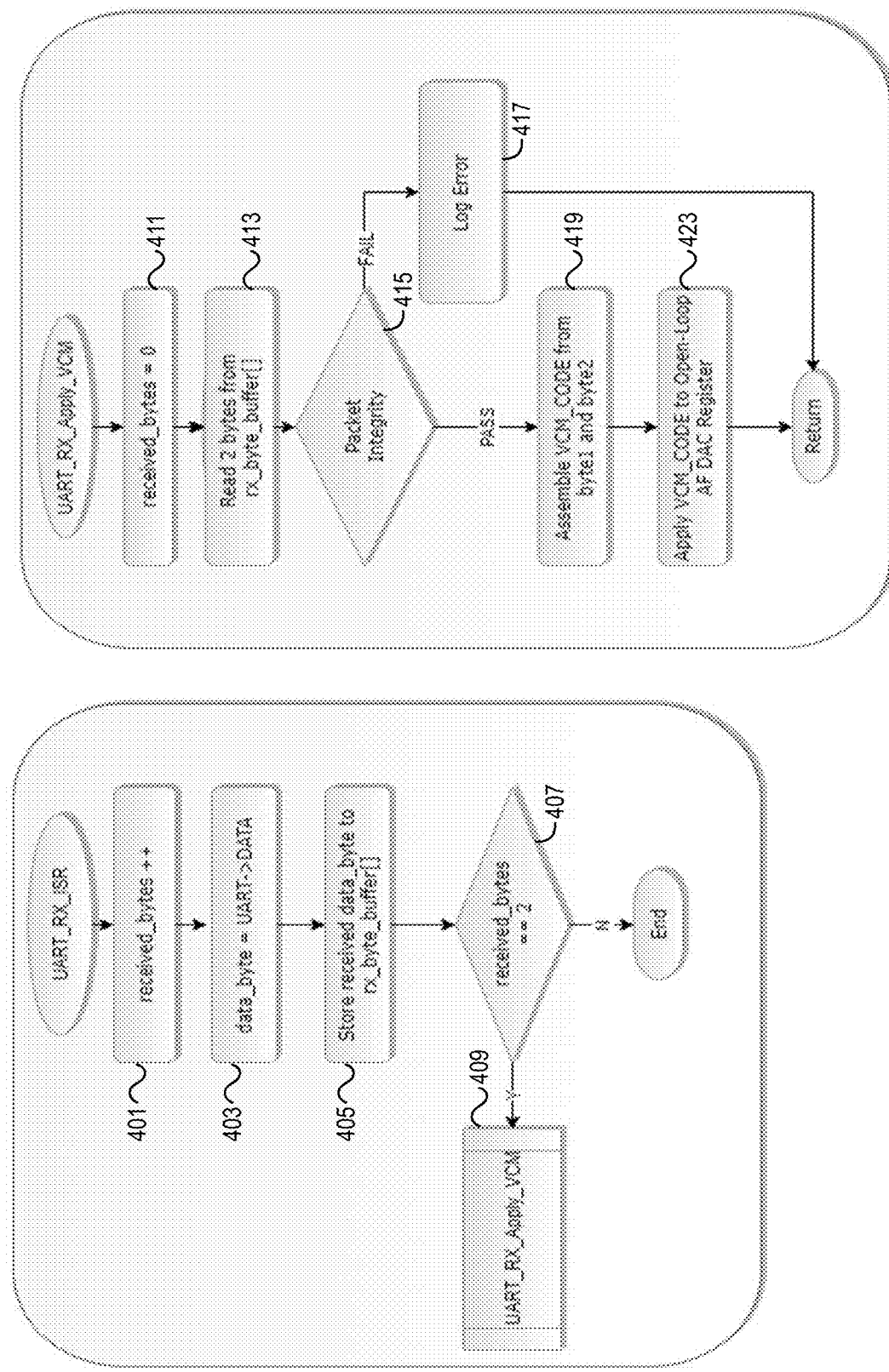
FIG. 4 is an example flowchart illustrating an UART Receive Interrupt Service Routine (ISR) process of the secondary device of FIG. 1 in accordance with embodiments of the present disclosure.

The application of VCM code on the secondary device is done entirely in UART Receive ISR (Interrupt Service Routine)-UART_RX_ISR-context. As soon as a complete VCM packet is received on the secondary device (blocks 401 through 407), VCM code is extracted from the packet after it passes a basic integrity check (blocks 411 through 417). The extracted VCM code is applied to the open-loop DAC register on the secondary device for immediate effect (block 409 and blocks 419 and 423). This process on the secondary device is shown in the flow-chart of FIG. 4.

UART Transmit Driver

Unlike the secondary device, which applies the VCM code immediately upon receipt, the primary device precisely times the application of the VCM code to coordinate the timing of the application and keeps the primary/secondary skew to a minimum. The handling of the VCM code on the primary device depends on the system state—(a) open-loop mode and (b) closed-loop mode.

Open-Loop

In the open-loop mode, the primary device receives the open-loop DAC code from the host processor over an I2C interface. In the absence of full-duplex UART communication, the primary/secondary synchronization is achieved by the primary device deferring and precisely delaying the application of received open-loop code until after initiating the transmission of open-loop code to the secondary device over UART. On the primary device, indication of the secondary device receiving the VCM Code packet is acknowledged via UART_TX_ISR which triggers upon completion of the UART transmission. The flow-chart shown in FIG. 5 outlines the handling of open-loop code on the primary device in an I2C ISR that services host processor command for open-loop DAC codes.

Figure 5:
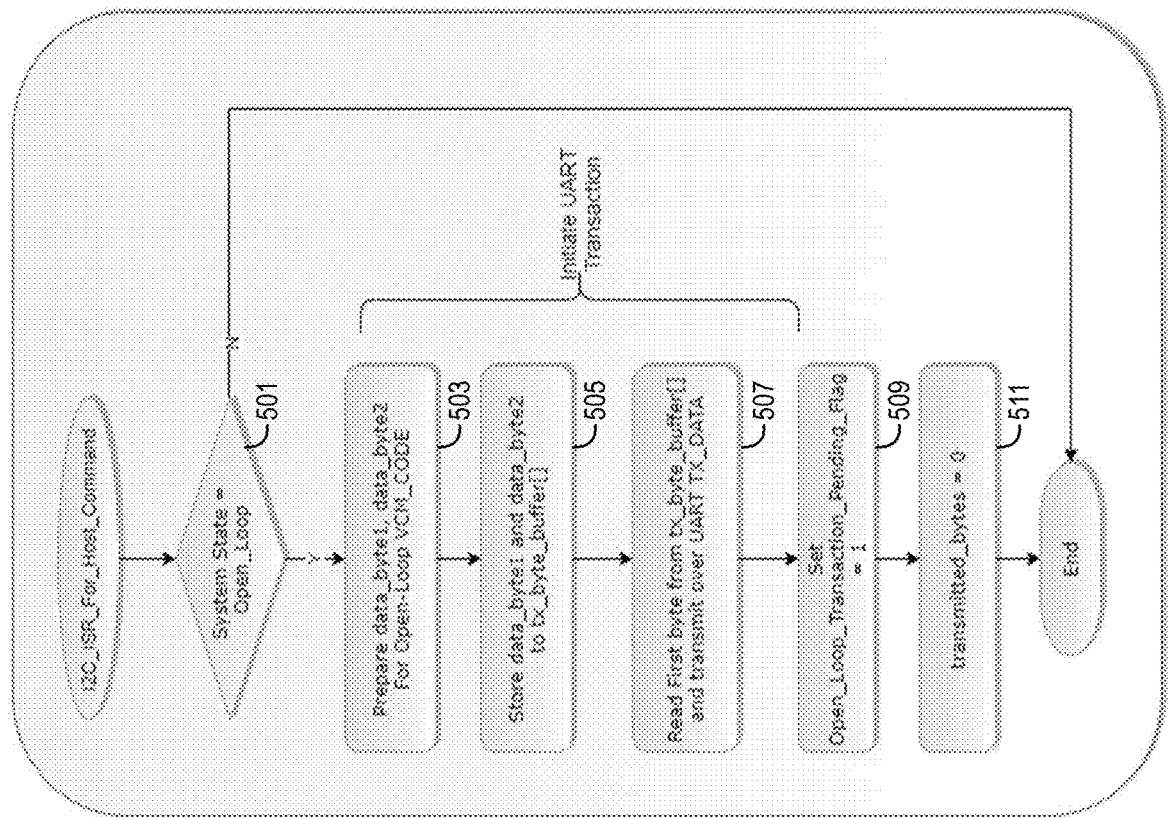
FIG. 5 is an example flowchart illustrating the handling of open-loop code on the primary device of FIG. 1 in an I2C ISR that services host processor commands for open-loop digital-to-analog converter (DAC) codes in accordance with embodiments of the present disclosure.
Figure 6:
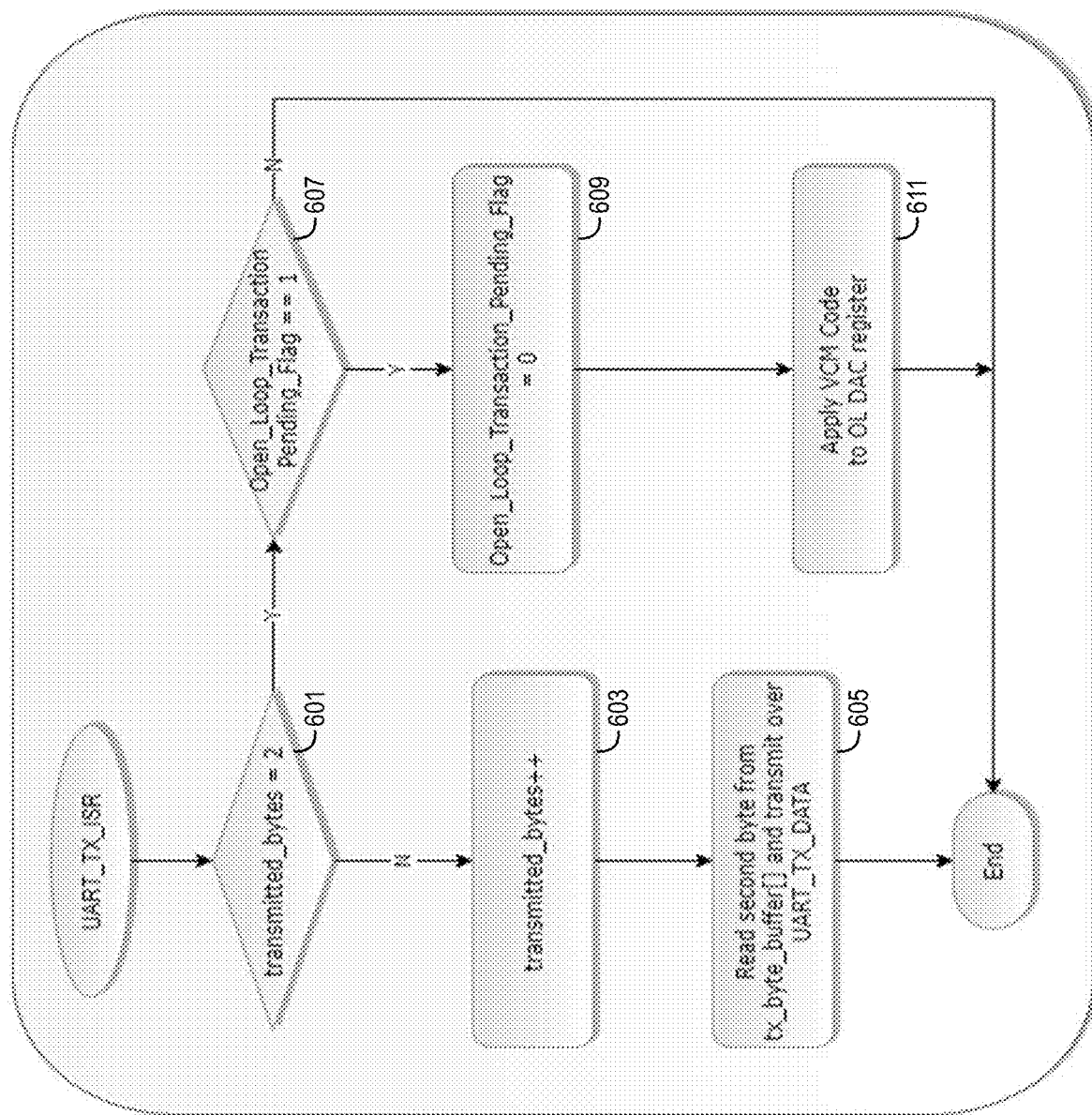
FIG. 6 is an example flowchart illustrating an UART Transmit ISR process of the primary device of FIG. 1 in accordance with embodiments of the present disclosure.

As shown in the above flow-chart of FIG. 5, in the open-loop mode (block 501), the primary device forms VCM packet and initiates transfer over UART (blocks 503 through 507). The primary device also sets the Open_Loop_Transaction pending flag (blocks 509 and 511) indicating that upon completion of transmission of the UART packet (blocks 601 through 609), open-loop VCM code needs to be applied to the output driver (block 611) on the primary device in the UART Transmit ISR-UART_TX_ISR. The flow-chart of FIG. 6 outlines UART_TX_ISR.

Closed-Loop

In the closed-loop mode of operation (block 701), there is a fixed but programmable cadence of application of closed-loop DAC codes to the output driver with respect to each instance of the control-loop. Each instance of the control loop computes the closed-loop VCM codes (blocks 703 and 705) based on the sensor inputs and host position command. However, the application of the closed-loop VCM codes to the output driver is hardware assisted and takes place after a programmable delay from the start of each control loop instance. In order to synchronize the application of VCM codes between the primary device and the secondary device, the primary device uses the Event Timer capability of the hardware. Event Timer produces an event/interrupt at a programmable delay with respect to an external trigger. In this case, the commencement of each instance of the control loop starts the count-down of the Event Timer. The programmable delay between the commencement of each instance of control-loop and the event on the primary device is programmed such that the event is triggered just enough before the hardware pick-up of closed-loop DAC code to both facilitate the transmission (blocks 707 and 709) and to account for the time to transmit the VCM code packet and its application on the secondary device to approximately coincide with the hardware pickup on the primary device. Handling of transmission of VCM code in Event_Timer_ISR is depicted in the flow-chart of FIG. 7.

Run-Time Execution Context

Figure 8A:
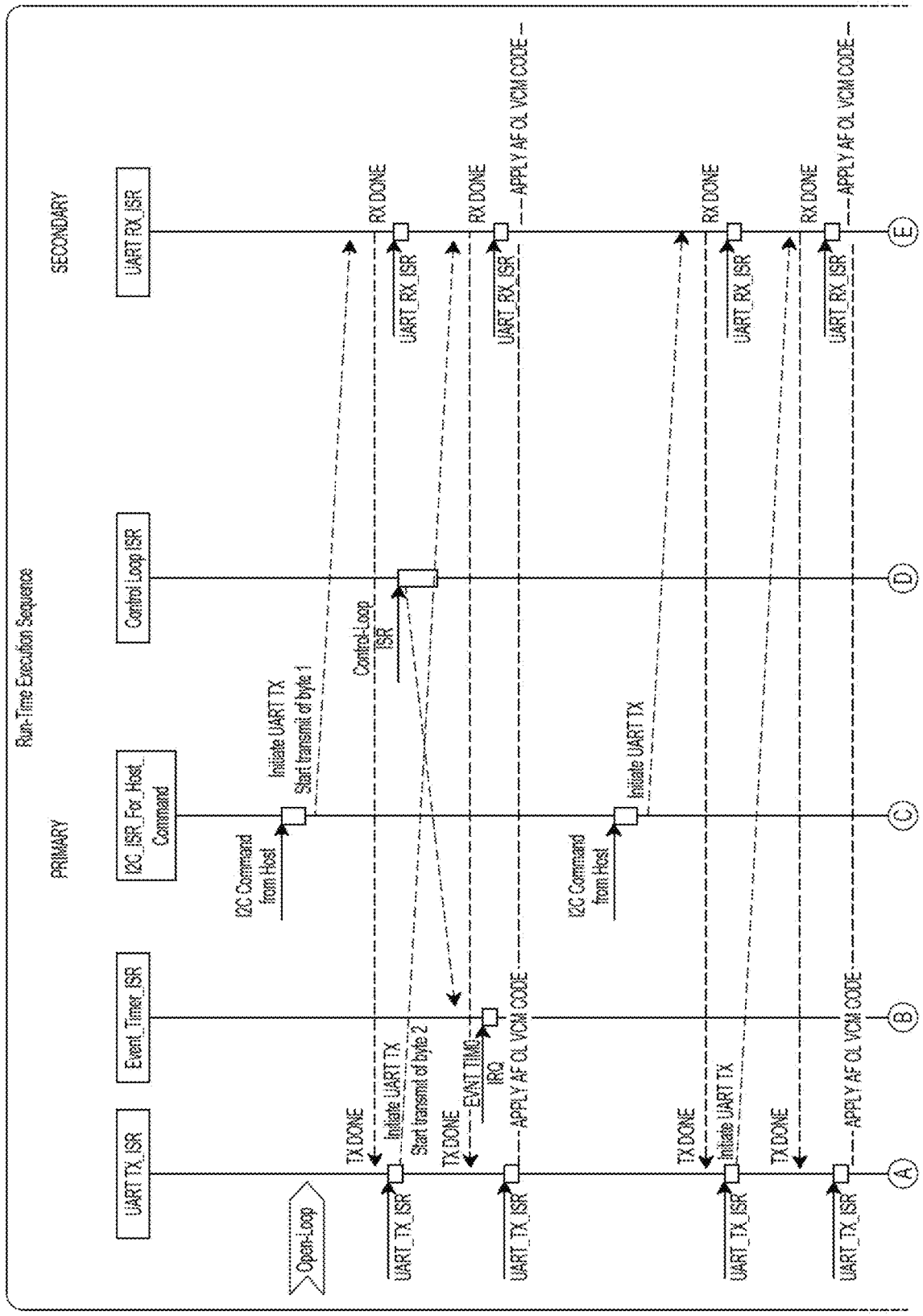
FIGS. 8A and 8B, referred to collectively as FIG. 8, is an example timing diagram illustrating run-time execution flow for open-loop and closed-loop states of the system of FIG. 1 in accordance with embodiments of the present disclosure.
Figure 8B:
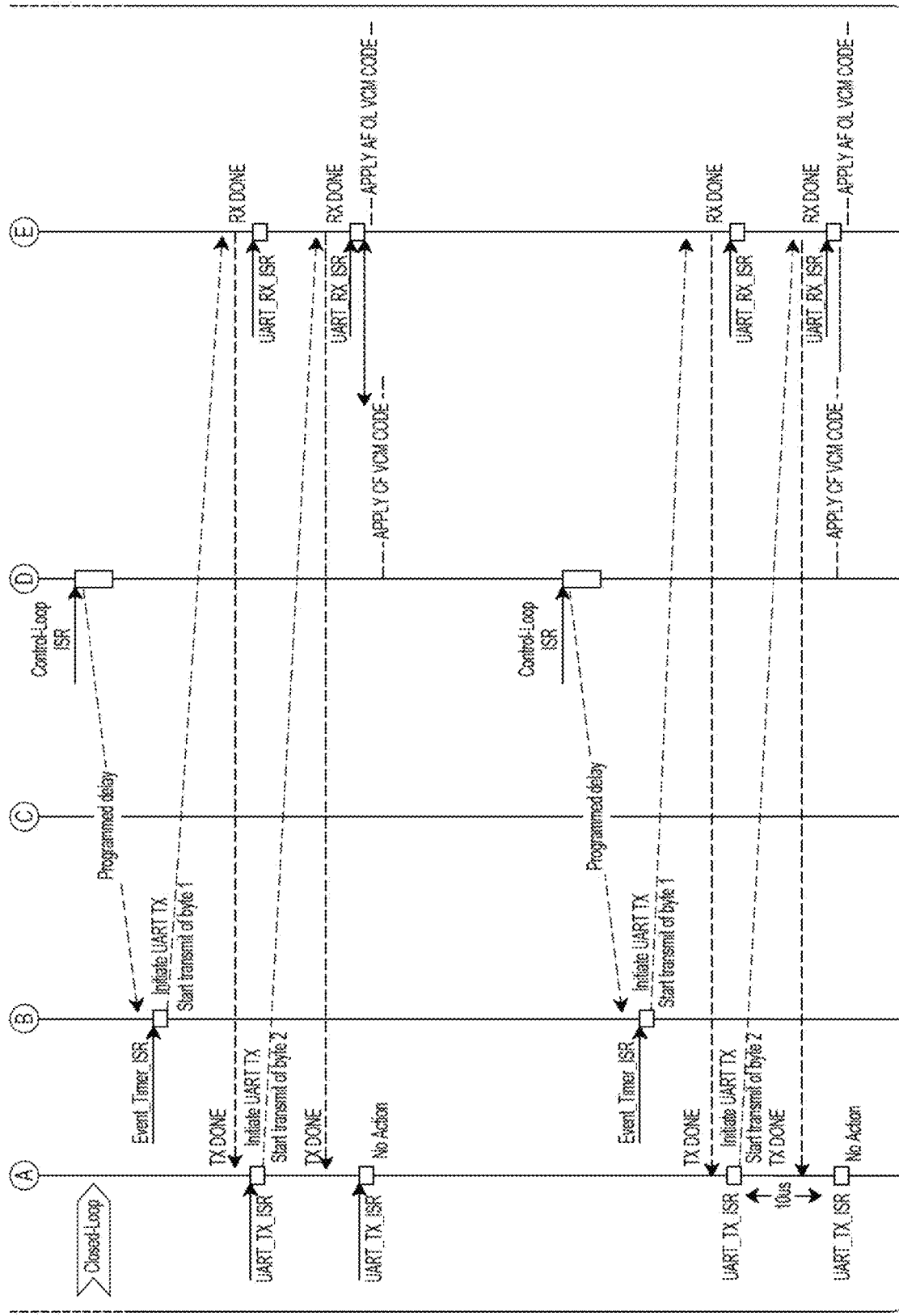

The run-time execution flow for the open-loop and closed-loop system states is depicted in FIGS. 8A and 8B, referred to collectively as FIG. 8. As shown in FIG. 8, the primary/secondary synchronization is achieved in both the system states. The use of Event Timer has been demonstrated to precisely control the timing of transmission of closed-loop codes so that hardware DAC pick-up on the primary device happens at the same time when these codes are received and applied on the secondary device.

Figure 9:
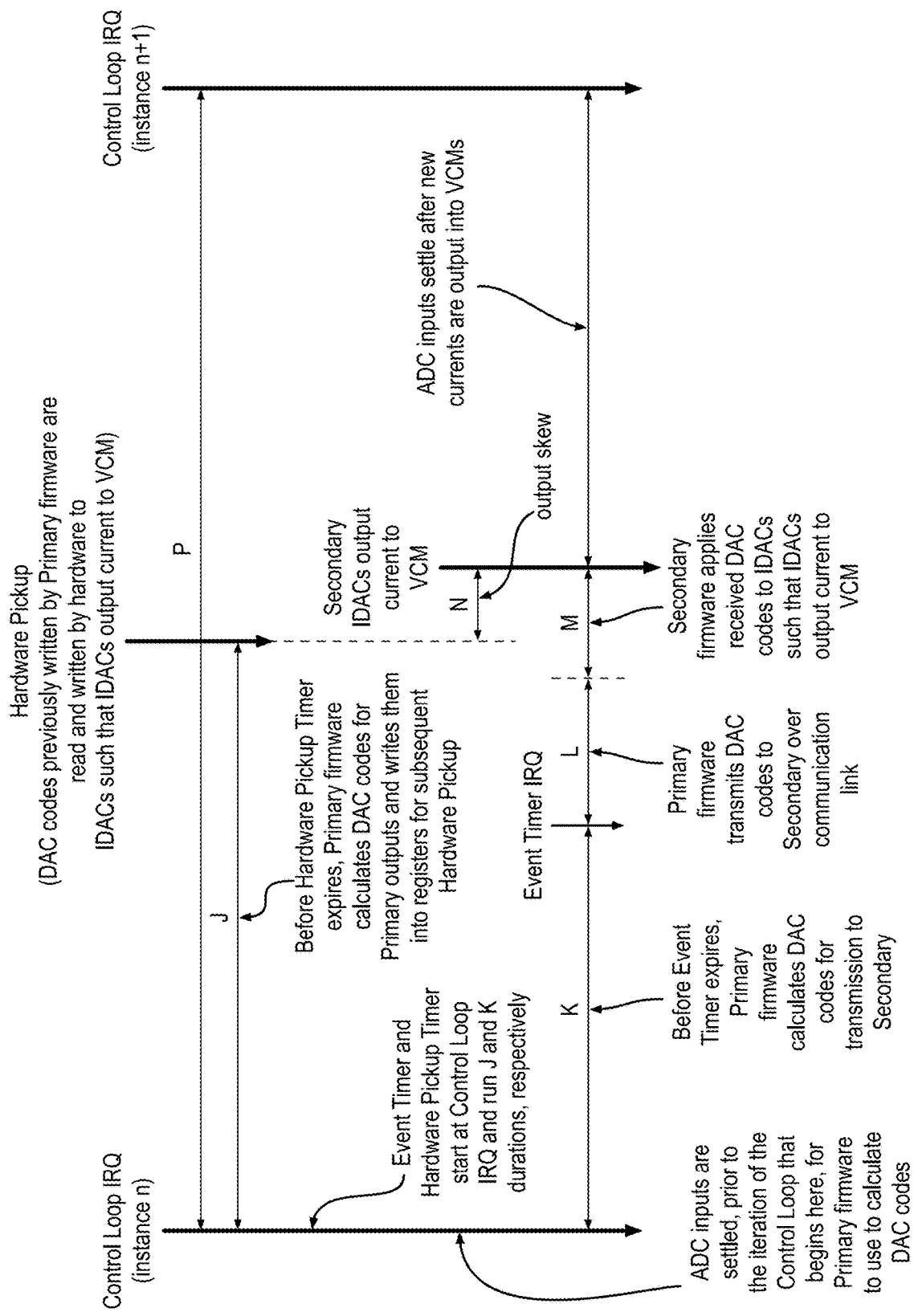
FIG. 9 is an example timing diagram illustrating operation of the system of FIG. 1 in accordance with embodiments of the present disclosure.

FIG. 9 is an example timing diagram illustrating operation of the system 100 of FIG. 1 according to embodiments of the present disclosure. FIG. 9 depicts in horizontally increasing time operation of the system 100 in closed-loop mode similarly depicted in vertically increasing time in FIG. 8. It is noted that although the system 100 is operating as a whole in closed-loop mode, the secondary device continues to operate in open-loop mode. That is, although the primary device periodically updates its outputs and transmits DAC codes to the secondary device in a closed-loop fashion to accomplish a command (e.g., camera position) previously received from the host processor (potentially many closed loop intervals ago), the secondary device always operates in open-loop mode, i.e., it always applies the DAC codes received from the primary device as soon as possible after being received.

At initialization of the primary device, the primary device is programmed with three timer values. First, a control loop timer is programmed with a delay shown in FIG. 9 as P (e.g., 200 microseconds). The control loop timer periodically triggers to generate a control loop IRQ. Two instances of the control loop IRQ are shown. Second, an event timer is programmed with a delay shown in FIG. 9 as K (e.g., 80 microseconds). The control loop timer begins to run when the control loop IRQ triggers and runs for K time at the end of which a control loop IRQ triggers. Third, a hardware pickup timer is programmed with a delay shown in FIG. 9 as J (e.g., 120 microseconds). The hardware pickup timer begins to run when the control loop IRQ triggers and runs for J time at the end of which the pickup hardware of the primary device picks up DAC codes previously written into registers of the primary device and applies the DAC codes to the current DACs of the primary device so that the current DACs output current to the camera VCMs (or other controlled elements of other devices in alternate embodiments).

Prior to the control loop IRQ, ADC inputs received from the camera VCMs (or other inputs from other devices in alternate embodiments) have settled and are available for use by the primary device firmware to calculate DAC codes for the control loop iteration that is about to start. Before the event timer expires, i.e., before the event timer IRQ triggers, the firmware of the primary device calculates DAC codes based on the settled ADC inputs for transmission to the secondary device. Additionally, before the hardware pickup timer expires, the firmware of the primary device calculates DAC codes based on the settled ADC inputs for application by the pickup hardware to the outputs of the primary device.

Figure 7:
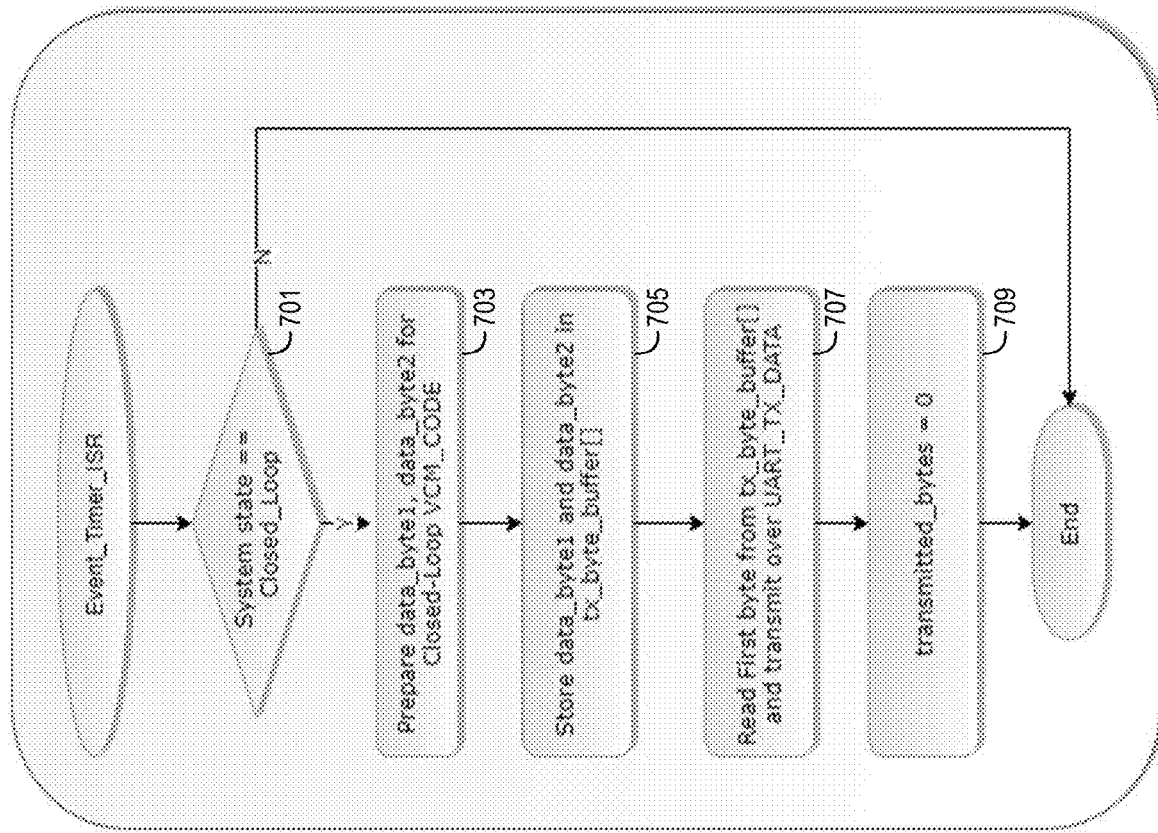
FIG. 7 is an example flowchart illustrating the handling by the primary device of FIG. 1 of transmission of a voice coil motor (VCM) code in event timer ISR in accordance with embodiments of the present disclosure.

In response to the event timer IRQ, the primary device transmits the DAC codes to the secondary device over the communication link according to the operation shown in FIG. 7, for example. The primary device firmware execution and DAC code transmission time is shown in FIG. 9 as a time L from the event timer IRQ. In response to receiving the DAC codes, the secondary device applies in an open loop fashion (i.e., as soon as possible and without delay) the received DAC codes to its current DACs so that the current DACs output current to the camera VCMs according to the operation shown in FIG. 4, for example. The secondary device firmware execution time is shown in FIG. 9 as a time M from reception of the DAC codes. Thus, the outputs of the secondary device generate the new current values to the camera VCMs at a point in time that is effectively K plus L plus M after the control loop IRQ, as shown. As described above, the outputs of the primary device generate the new current values to the camera VCMs in response to the hardware pickup that occurs a programmable time J after the current loop IRQ, as shown. The time between the output by the primary device and the secondary device is the primary/secondary output skew described above, which is shown as time N in FIG. 9. After the outputs generate the new current values to the VCMs, the ADC inputs from the sensors at the VCMs begin to settle and are settled prior to the next instance of the control loop IRQ.

As described above, the difference between the hardware pickup timer delay (J) and the event timer delay (K) is chosen to accomplish a couple of competing goals. One goal is to reduce the output skew (N), based on the primary device firmware delay plus transmission time (L) and the secondary device firmware delay (M). Another goal is to provide the firmware of the primary device sufficient time to calculate the secondary and primary DAC codes before the event timer triggers and the hardware pickup timer triggers, respectively. Advantageously, the values of J and K are programmable and therefore are effectively "knobs" that may be adjusted to tune the system 100 to meet the need of the application, e.g., camera control.

As described above, each of the primary and secondary devices may be separately configured to operate in either open loop mode or in closed loop mode. However, in the embodiments described, the secondary device is always configured to operate in the open loop mode. When the primary device is configured in the closed loop mode, the host processor sends information to the primary device (e.g., via the I2C interface), e.g., camera position information. The primary device then determines the current values that need to be output to the VCM's (via DAC codes) to cause the camera to reach and stay at the position specified by the host processor. Whereas, when the primary device is configured in open loop mode, the host processor directly specifies the current values (or the DAC codes that determine the current values), and the primary device simply applies its portion of the DAC codes and transmits the other portion to the secondary device. In other words, in open loop mode, it is the responsibility of the host processor to get the camera to the desired position without the primary device knowing the position, whereas in closed loop mode it is the responsibility of the primary device to get and keep the camera at the position commanded by the host processor. Furthermore, in open loop mode, the primary device immediately applies the DAC codes received from the host processor to generate the output current; whereas, in closed loop mode, the primary device waits to apply the DAC codes that it calculates to generate the output current until the hardware pickup timer triggers, which is periodic and programmable. For example, when the device in which the system 100 is included (e.g., phone with a camera) is started up (e.g., powered on or reset), the host processor of the phone may configure the primary device in open-loop mode to send DAC codes that coarsely position the lens of the camera, e.g., to a default position. Later, the host processor may receive more information (e.g., based on user input) about where the lens needs to be positioned and configures the primary device in closed-loop mode and sends the position to the primary device, in response to which the primary device positions the camera lens more finely and maintains the quality of the position of the camera lens.

Advantageously, the primary and secondary devices work together to appear to the host processor as a single operating entity whose outputs are synchronized. In one embodiment, the secondary device may inform the primary device in the event of a packet integrity failure so that the primary device may retransmit the packet. Additionally, the primary device may notify the host processor of such a failure and retransmission. Further advantageously, the system may be configured in multiple configurations with respect to the multiple outputs provided by the primary/secondary device combination. For example, embodiments are described above in which each of the primary and secondary devices has three outputs. One embodiment is described above in which VCM that controls an Optical Image Stabilization (OIS) subsystem of the camera are driven by two outputs of the primary device, and VCM that control an Auto-Focus (AF) subsystem of the camera are driven by one output of the primary device and by one output of the secondary device. Another embodiment is described above in which the OIS subsystem is driven by two outputs of the primary device and the AF subsystem is driven by two outputs of the secondary device. However, the system may be configured in other combinations according to other embodiments to meet the needs of the application. For example, in one embodiment, there may be separate OIS-X and OIS-Y subsystems, in addition to an AF subsystem. Additionally, the system may be configured in different dimensions to accommodate operation of different subsystems in different modes. For example, the primary device may be configured in closed loop mode for one or more of the subsystems and configured in open loop mode for one or more of the remaining subsystems. Advantageously, the embodiments described herein provide a system in which the primary/secondary device combination appears to the host processor as a single device having N total available outputs when in fact each of the primary and secondary devices individually includes less outputs than the N total outputs. This configuration is advantageous because it alleviates the need for a re-design of the device to provide the needed N total outputs within a single device, which could involve significant investment both in terms of time and cost. Furthermore, in the case that the device is already pin-limited, a re-design may not be possible or may be possible only at the cost of a sacrifice in other features of the device.

As described above, in one embodiment, the Event Timer duration is programmed as an amount of time that begins to run after the Control Loop IRQ event occurs. In an alternate embodiment, the Event Timer duration may be programmed as an amount of time leading up to the hardware pickup, i.e., relative to the hardware pickup rather than relative to the Control Loop IRQ. That is, the Event Timer IRQ occurs the programmed amount of time before the hardware pickup occurs. However, because of the transitive property and the fact that the hardware pickup timer is relative to the Control Loop IRQ, according to the alternate embodiment, the Event Timer IRQ is still effectively specified relative to the Control Loop IRQ event.

Although embodiments have been described for use in controlling a camera, more particularly voice coil motors of a camera, other embodiments are contemplated in which the primary/secondary device combination is used to control other types of devices. Finally, although embodiments are described in which a single secondary device is employed to expand the output capability of the system, other embodiments are contemplated in which an additional secondary device (or multiple additional secondary devices) may be in communication with the primary device—via another communication link between the primary device and the additional secondary device or via a communication link shared by the primary device and the multiple secondary devices—such that the primary device transmits updated values to the additional secondary device and the additional secondary device responsively applies the received updated values on its outputs.

As described above, modern camera controllers may require multiple sensors and voice coil motors (VCM), or other types of actuators, for optical image stabilization (OIS) and auto focus (AF). For a complex system, it may be advantageous to use multiple camera controller devices instead of a single device. Using multiple devices may offer the following advantages. First, multiple devices may increase power drive, since a single device may not have enough output drivers to drive the required power into the voice coil motors. Second, multiple devices enable a modular design since more devices can be added as needed to increase the number of output driver channels, increase the number of sensor channels, and increase the overall signal processing. Third, multiple devices may simplify the programming model by having the host communicate only with the primary device, in mission mode, which in turn communicates with the secondary devices.

Figure 10:
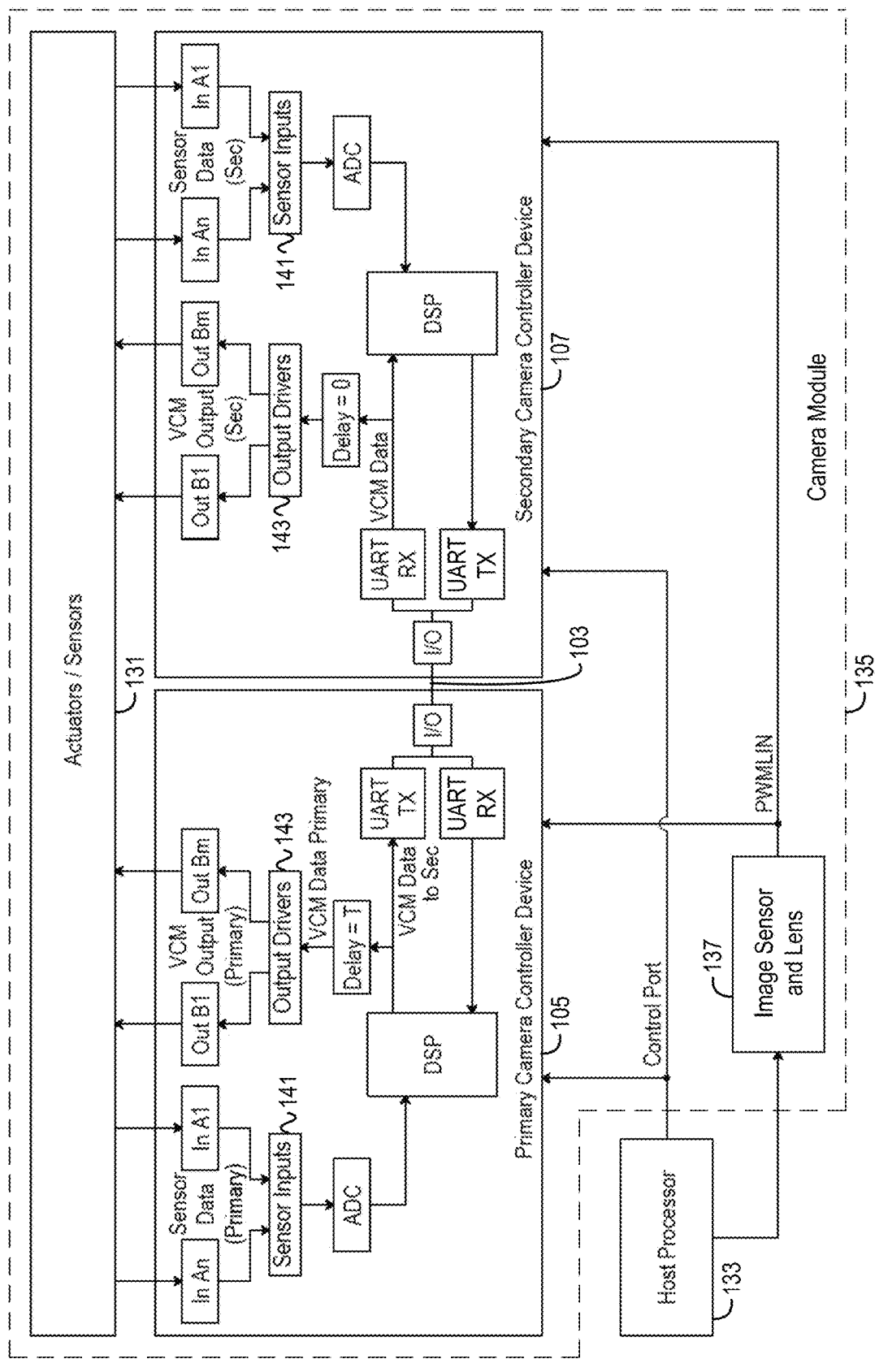
FIG. 10 is an example block diagram illustrating a system in accordance with embodiments of the present disclosure.

FIG. 10 is an example block diagram illustrating a system 1000 in accordance with embodiments of the present disclosure. The system 1000 includes a host processor 133, an image sensor and lens 137, a primary camera controller device 105 (also referred to herein as the primary device or the primary), a secondary camera controller device 107 (also referred to herein as the secondary device or the secondary), a communication link 103 connecting the primary camera controller device 105 and the secondary camera controller device 107, and actuators/sensors 131. In one embodiment, the image sensor and lens 137, actuator and sensors 131, primary camera controller device 105 and secondary camera controller device 107 are incorporated within a physical entity referred to as a camera module 135.

Each of the primary camera controller device 105 and the secondary camera controller device 107 includes a digital signal processor (DSP), a communication link transmit pad (shown in FIG. 10 as "UART TX") used to transmit data provided by the DSP over the communication link 103, a communication link receive pad (shown in FIG. 10 as "UART RX") used to receive data from the communication link 103 for provision to the DSP, and an I/O pin connected to the communication link transmit and receive pads and connected to the communication link 103. Each of the primary camera controller device 105 and the secondary camera controller device 107 also receive from the sensors 131 sensor data (shown in FIG. 10 as "In A1" through "In An") that are provided to sensor inputs 141, and the sensor inputs 141 are provided to an analog-to-digital converter (ADC) whose digital outputs are provided to the DSP. Each of the primary camera controller device 105 and the secondary camera controller device 107 also include output drivers 143 that receive VCM data, also referred to as control data, from the DSP and drive VCM outputs (shown in FIG. 10 as "Out B1" through "Out Bn") to control the actuators 131. The output drivers 143 may include a digital-to-analog converter (DAC) to convert digital VCM data to analog VCM outputs. In the embodiment shown in FIG. 10, the primary camera controller device 105 DSP drives the VCM data to the output drivers 143 with a delay (shown in FIG. 10 as "T") relative to a DSP frame of the primary camera controller device 105, as described in more detail below. The PWMLIN may be used by the image sensor to indicate to the primary and secondary camera controller devices that a picture is being taken by the image sensor so that the primary and secondary camera controller devices may switch to a linear mode in order to reduce interference.

The primary camera controller device 105 is a first package (e.g., integrated circuit, or chip), and the secondary camera controller device 107 is a second package (e.g., integrated circuit, or chip), and the two devices are coupled together by the communication link 103 by which they communicate with one another in the various ways described herein. Advantageously, the communication link 103 enables the tasks of sensing and controlling the image sensor and/or lens 137 to be distributed between the primary camera controller device 105 and the secondary camera controller devices 107. Although embodiments are described with respect to FIG. 10 and other Figures in which there is a single secondary camera controller device 107 in communication with the primary camera controller device 104 via a single communication link 103, other embodiments are contemplated in which the system 1000 includes multiple secondary camera controller devices each in communication with the primary camera controller device via a respective communication link in order to appreciate benefits described herein, e.g., increased power drive, increased number of output driver channels, increased number of sensor channels, increased overall signal processing, and simplified programming model.

The primary and secondary device processing may be configured by the host processor to do one of the following. In a first configuration, sensors are enabled on the primary device only, and the sensor/loop processing is performed only on the primary device. In a second configuration, the sensors are enabled on both the primary and secondary devices, and the sensor/loop processing is performed only on the primary device. In a third configuration, the sensors are enabled on both the primary and secondary devices, and the sensor/loop processing is performed on both the primary and secondary devices.

In the first configuration, motion sensors are enabled on the primary device only. Primary sensor processing is done on the primary device. Control loop processing is done on the primary device. Primary and secondary VCM codes are generated on the primary device. In one embodiment, secondary health sensing (e.g., temperature and voltage) is done on the secondary device.

In each of the three configurations, there are two communication modes: initialization mode and mission mode. In initialization communication mode, at startup, the host processor initializes and configures the primary and secondary devices through the control port of FIG. 1 as follows. The host processor configures the primary and secondary devices, enables the communication link on the primary device, and enables the communication link on the secondary device. The communication link may be a UART. In one embodiment, the UART may be similar to the UART 109 of FIG. 1. Once initialized, the devices transition to mission communication mode where the host communicates mainly with the primary device. The host may need to communicate with the secondary device in case of an error or to restart the system.

There are two modes of operation: open loop mode and closed loop mode. In the open loop mode, the primary and secondary VCM code values are directly controlled by the host. The host enables open loop mode on the primary device. The host periodically writes the primary and secondary DAC codes to the primary device. The primary device sends the secondary VCM data packet to the secondary device, which may contain the following information: a digital-to-analog converter (DAC) code, a status request byte, and a frame termination byte, or flush byte (e.g., with a value of 0xFF). After a fixed delay to match the communication link latency, the primary device applies the primary DAC codes to the primary device. When the 0xFF frame termination byte is received by the secondary device, the secondary device checks for errors and, if no errors are detected, the secondary device applies the DAC code data to its output drivers. When requested by the host, the primary device sends a status request as part of the DAC code packet to the secondary device. When requested by the primary device, the secondary device responds back with device and link status information, which may include device status (device warnings, errors), device temperature and voltage measurements, and communication link status. A timeout error may be generated if the primary device does not receive the secondary response within the timeout period.

Figure 11:
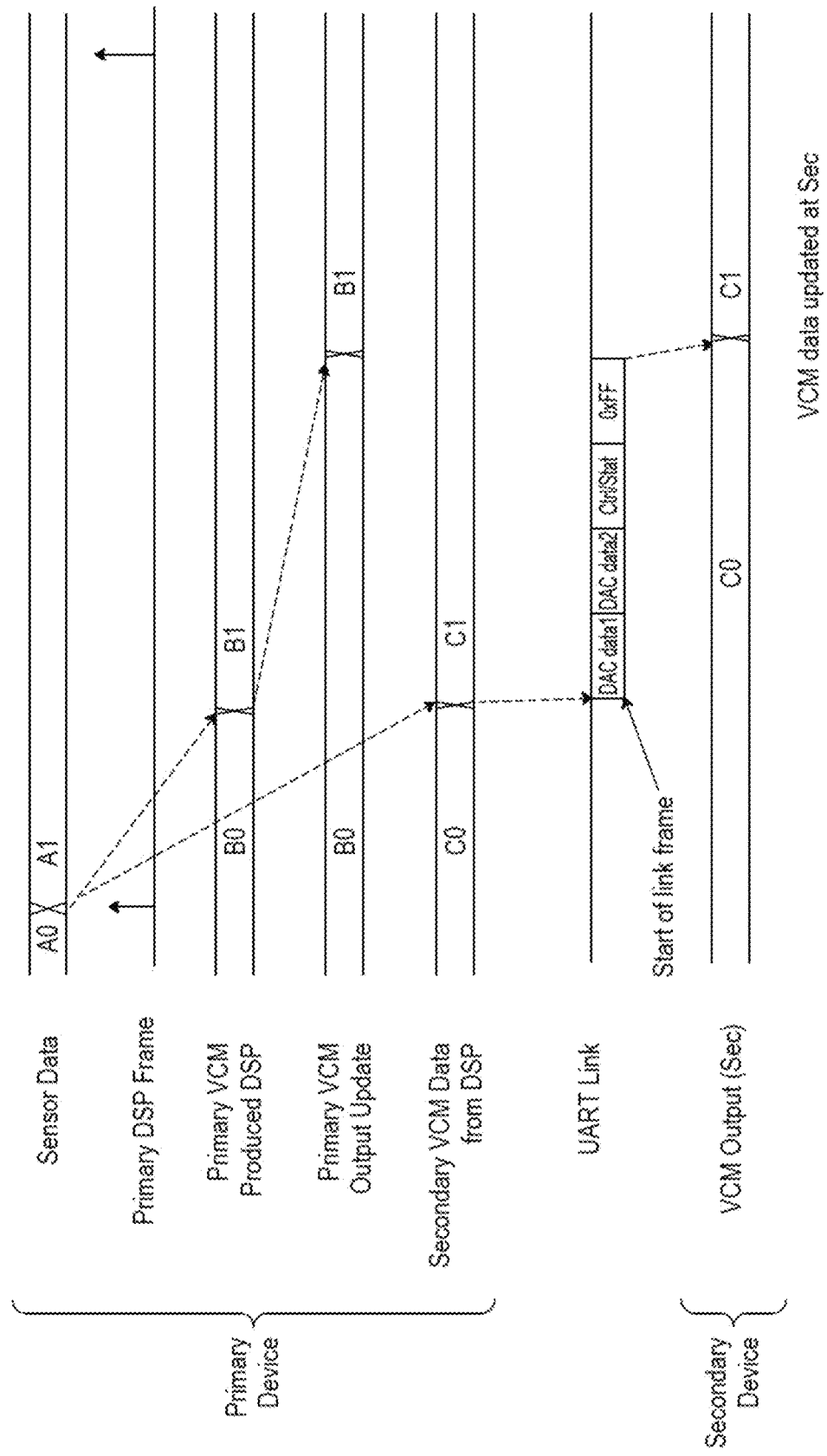
FIG. 11 is an example timing diagram illustrating operation in the first configuration in the closed loop mode in accordance with embodiments of the present disclosure.

FIG. 11 is an example timing diagram illustrating operation in the first configuration in the closed loop mode in accordance with embodiments of the present disclosure. In the closed loop mode of operation, the host enables closed loop mode on the primary device. The primary device processes sensor information and position codes from the host at a fixed frame rate. In each frame, the primary device DSP produces the DAC codes for the primary and secondary output drivers and sends the secondary device its DAC codes. When the 0xFF frame termination byte is received by the secondary device, the secondary device checks for errors and, if no errors are detected, the secondary device applies the DAC code data to its output drivers. For every N number of frames, where N is programmable integer, the primary device requests secondary status information. When requested by the primary device, the secondary device responds back with device and link status information, which may include device status (device warnings, errors), device temperature and voltage measurements, and communication link status. A timeout error may be generated if the primary device does not receive the secondary response within the timeout period.

As stated above, there are two configurations (second and third configurations) in which the camera sensors are enabled on the primary and secondary devices. In the second configuration, all loop processing is done on the primary device. In the third configuration, primary loop processing is done on the primary device, and secondary loop processing is done on the secondary device. When the camera sensors are enabled on the secondary device (and the primary device), the secondary DSP frame is synchronized to the primary DSP frame to minimize the latency between the VCM data updates on the two devices.

Figure 12:
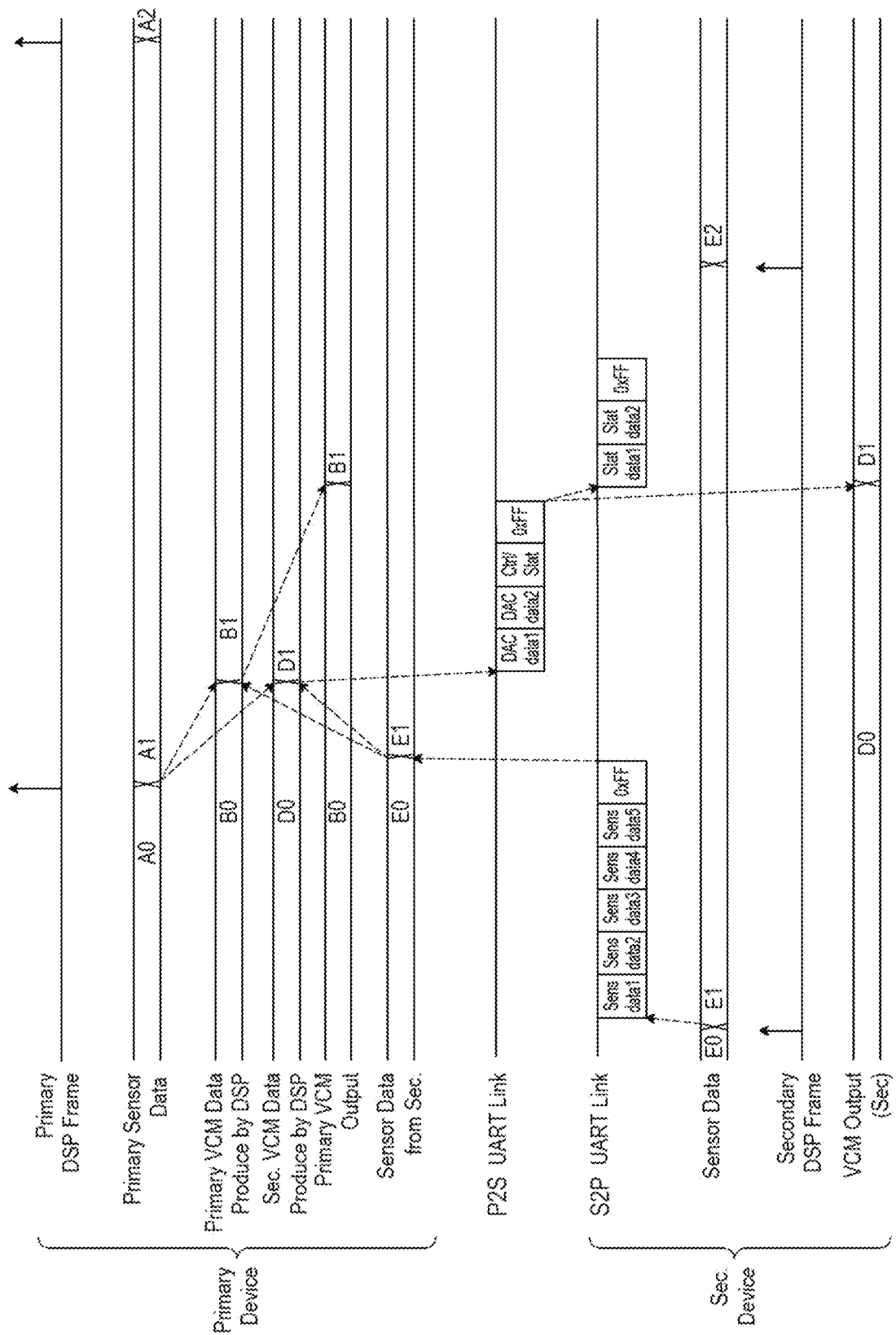
FIG. 12 is an example timing diagram illustrating operation in the second configuration in the closed loop mode in accordance with embodiments of the present disclosure.

FIG. 12 is an example timing diagram illustrating operation in the second configuration (camera sensors enabled on primary and secondary, and all loop processing is done on the primary device) in the closed loop mode in accordance with embodiments of the present disclosure. In the second configuration, secondary sensor data (E1) is captured at the start of the secondary DSP frame. The secondary DSP frame is timed to start before the start of the primary DSP frame to allow enough time for the secondary sensor data to be transferred to the primary device. Primary sensor data (A1) is captured at the start of the primary DSP frame. The primary DSP processes the control loop data. The primary DSP takes primary sensor data (A1), secondary sensor data (E1), VCM position data from the host and produces the VCM DAC data for the primary device (B1) and for the secondary device (D1). The secondary VCM data D1 is transferred through the communication link to the secondary device. After a latency equal to the secondary VCM data transfer through the communication link, the primary device applies its VCM Data. At about the same time, the secondary device also applies its VCM data.

Figure 13A:
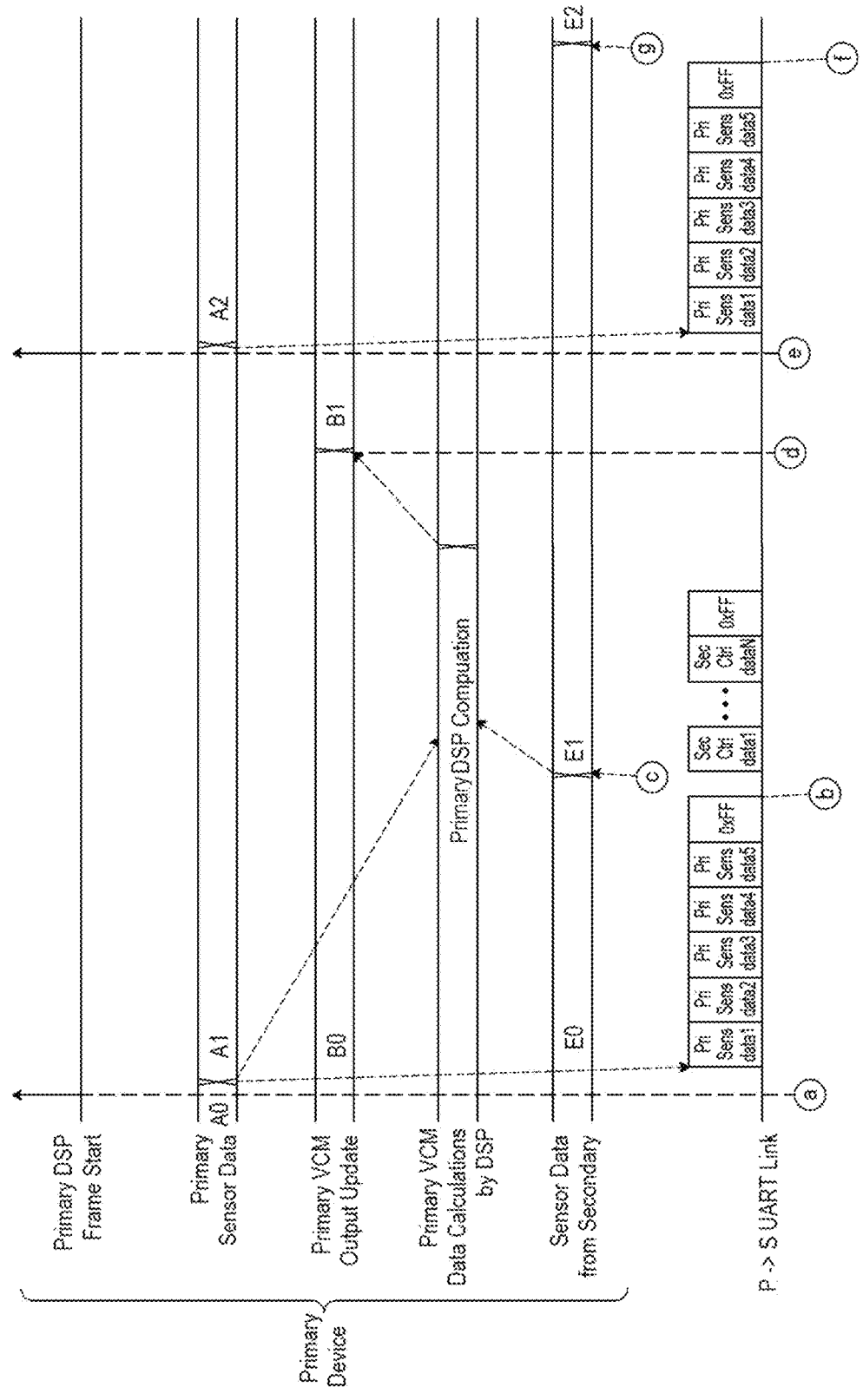
FIGS. 13A and 13B, referred to collectively as FIG. 13, is an example timing diagram illustrating operation in the third configuration in the closed loop mode in accordance with embodiments of the present disclosure.
Figure 13B:
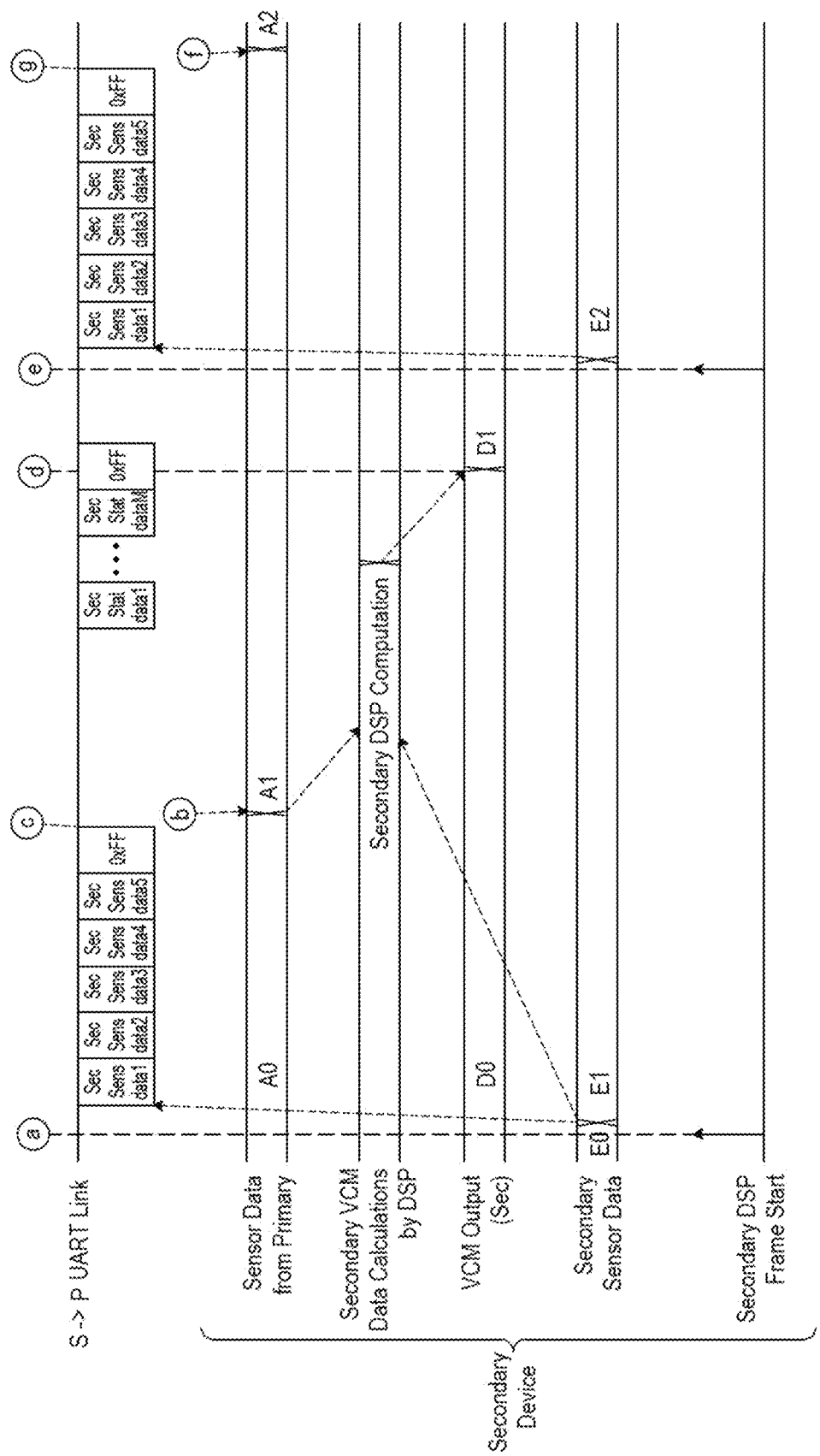

FIG. 13 (FIGS. 13A and 13B are referred to collectively as FIG. 13) is an example timing diagram illustrating operation in the third configuration (camera sensors enabled on primary and secondary, and primary loop processing is done on the primary device, and secondary loop processing is done on the secondary device) in the closed loop mode in accordance with embodiments of the present disclosure. Operation in the third configuration is similar to operation in the second configuration, however in the third configuration, each device does its own loop processing to produce its VCM outputs. The individual loop processing allows shorter loop latency at the expense of more data transferred from primary to secondary. As shown, primary sensor data and host VCM position data are transferred to the secondary device at the start of each DSP frame. The primary device may send control data (register writes/reads) to the secondary device on each DSP frame. The secondary device periodically sends status data to the primary device and in response to primary register read commands. Secondary data is transferred to the secondary device at the start of each DSP frame. To minimize the latency between the primary and secondary devices, the secondary DSP frame may be synchronized to the primary DSP frame. More specifically, the DSP frame, sensor data sampling, and DAC output updates are synchronized between the primary camera controller device and the secondary camera controller device, as shown. To accommodate the higher transfer rate, the link can be operated in full duplex mode or half duplex at a higher data rate. FIG. 13 illustrates the primary to secondary and secondary to primary transfers using the link in full duplex mode.

Figure 14:
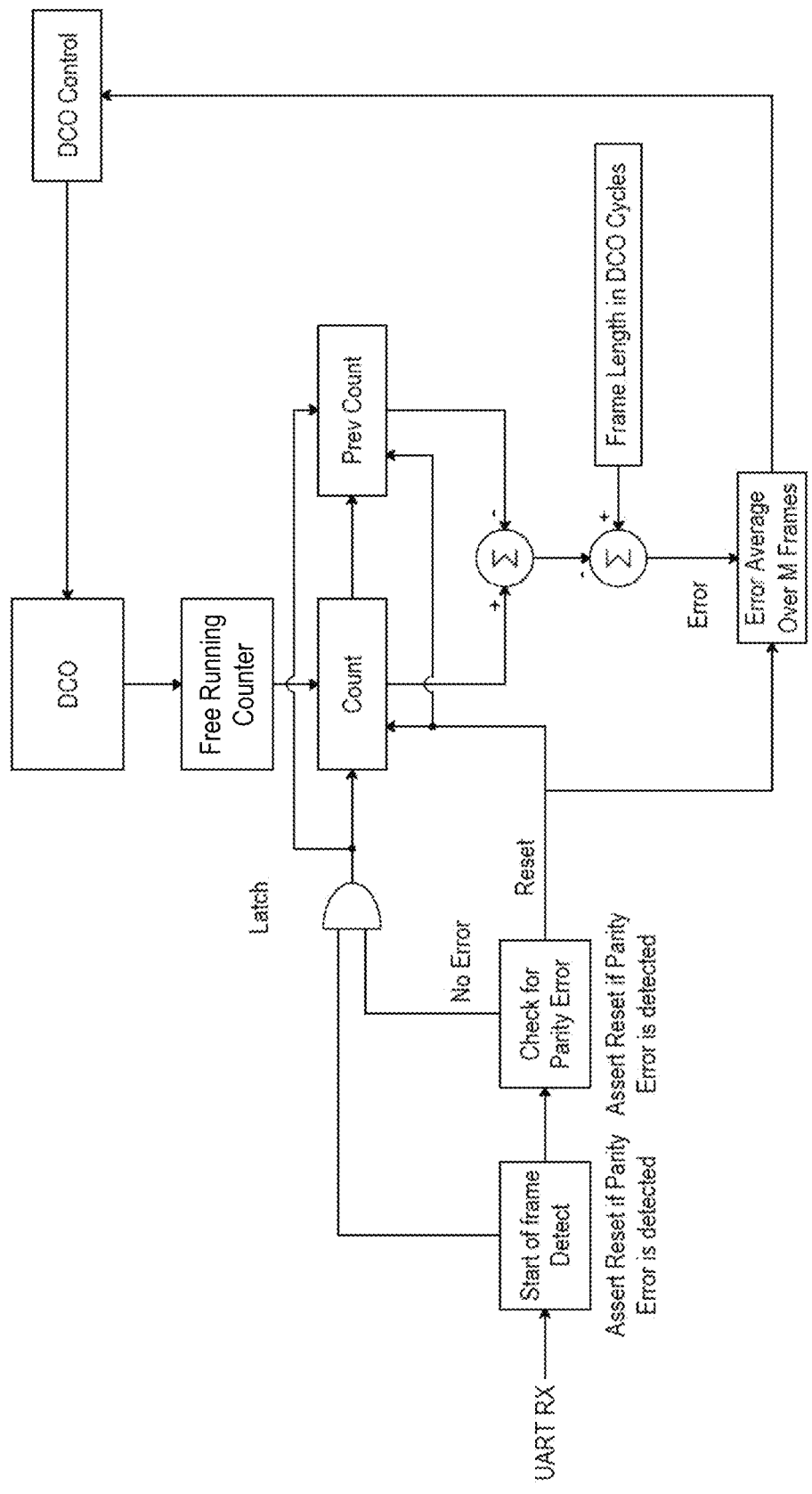
FIG. 14 is an example block diagram illustrating use of a free running counter on the secondary device to accomplish secondary to primary DSP frame synchronization in accordance with embodiments of the present disclosure.

FIG. 14 is an example block diagram illustrating use of a free running counter on the secondary device to accomplish secondary to primary DSP frame synchronization in accordance with embodiments of the present disclosure. When the camera sensors are enabled on the secondary device, the secondary DSP frame is synchronized to the primary DSP frame to minimize the loop latency. To accomplish the secondary to primary DSP frame synchronization, the free running counter is used on the secondary device to measure the incoming communication link frame period. In a first step, the primary device sends data (VCM or sensor) packets at a fixed delay relative to its DSP frame. In a second step, on the secondary device, the VCM UART header frame is detected. If no errors are detected on the received UART frame, the counter output is latched, and M is set equal to 1. In a third step, on the subsequent error free UART header frame detection, the free running counter output is latched and subtracted from the value latched in the second step. If an error is detected, the process goes back to the second step. In a fourth step, the frequency error is calculated by subtracting the delta value in the third step from the expected frame period. In a fifth step, the third and fourth steps are repeated for M frames. In a sixth step, the average is calculated over M frames. In a seventh step, the digitally controlled oscillator (DCO) frequency is adjusted by a code corresponding to the calculated frequency error. In an eighth step, the second through seventh steps are repeated.

Embodiments of communication link configurations will now be described. There are two communication link configurations. The communication link between the primary and secondary devices may be configured in a half-duplex configuration or in a full-duplex configuration.

Figure 15:
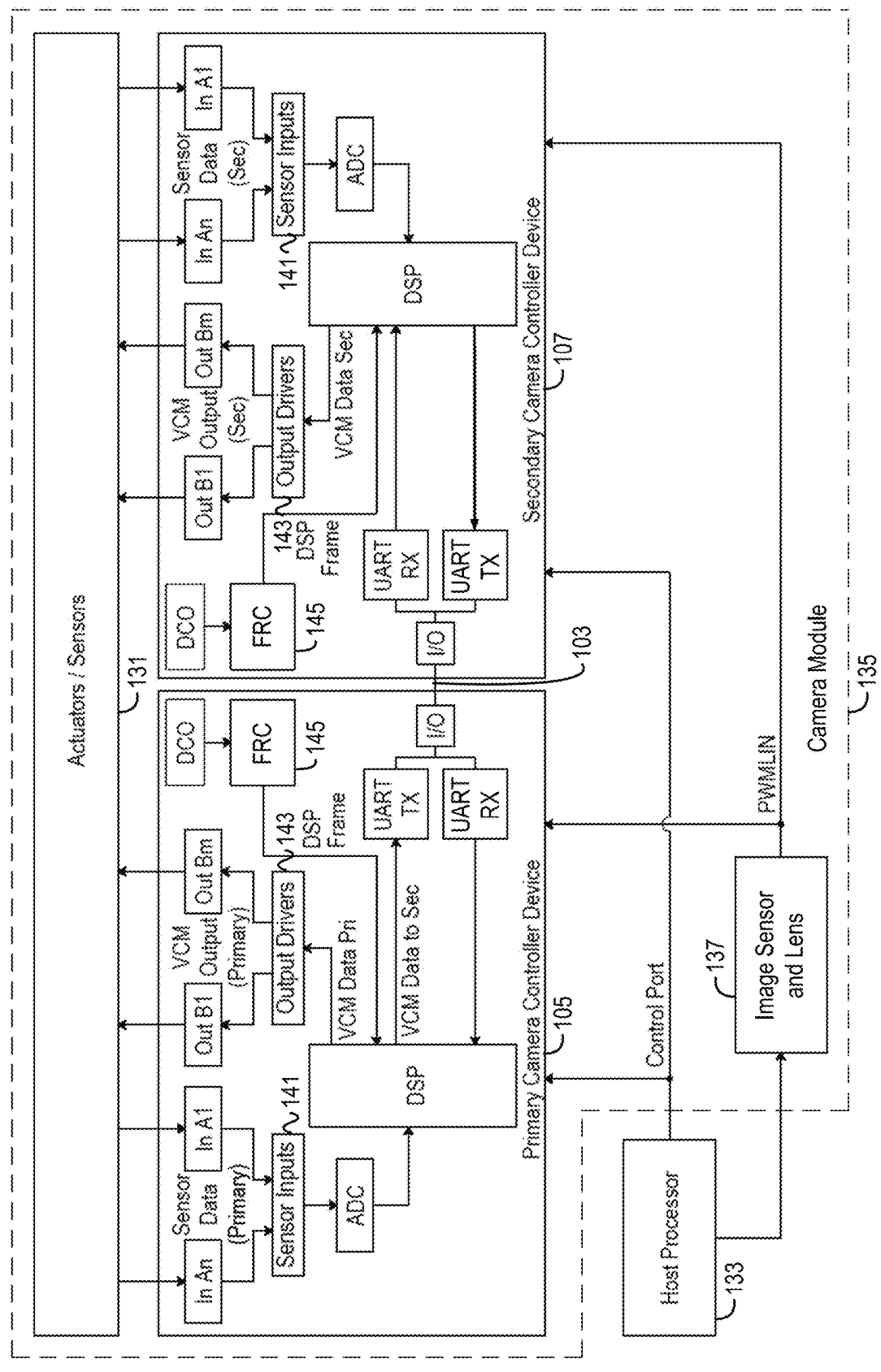
FIG. 15 is an example block diagram illustrating a system in a half-duplex configuration in accordance with embodiments of the present disclosure.

FIG. 15 is an example block diagram illustrating a system 1000 in a half-duplex configuration in accordance with embodiments of the present disclosure. The system 1000 of FIG. 15 is similar in many respects to the system 1000 of FIG. 10. In the system 1000 of FIG. 15, each of the primary camera controller device 105 and the secondary camera controller device 107 also is shown to include the DCO and the free running counter (FRC) of FIG. 14 that provides its output to the DSP.

In a half-duplex configuration, a single wire is used as the communication link for data transmission between the primary and secondary devices, as shown in FIG. 15. The UART transmit (TX) pad may be push pull or open drain. A pull-up resistor (internal or external) or a bus keeper may be used to keep the link in a high state when the primary and secondary devices are not driving. In half-duplex mode, the following protocol is followed. The primary device defaults to transmit mode. The secondary device defaults to receive mode. When the secondary status is requested, the primary device disables its output and enables its input for reception, and the secondary device enables its output for transmission and disables its input. When the secondary device completes its transmission, the secondary device switches to receive mode. After a timeout period, the primary device switches to transmit mode. The primary device sets a timeout error if it does not receive a response from the secondary device when requested. The primary and secondary devices continuously monitor UART TX. When contention is detected on the UART TX pad, an error bit will be set, and the TX drivers are disabled, e.g., by tri-stating the UART TX pad. Furthermore, the primary and secondary devices automatically tri-state if a major chip error is detected, such as an over temperature condition or expiration of a watch dog timer.

Figure 16:
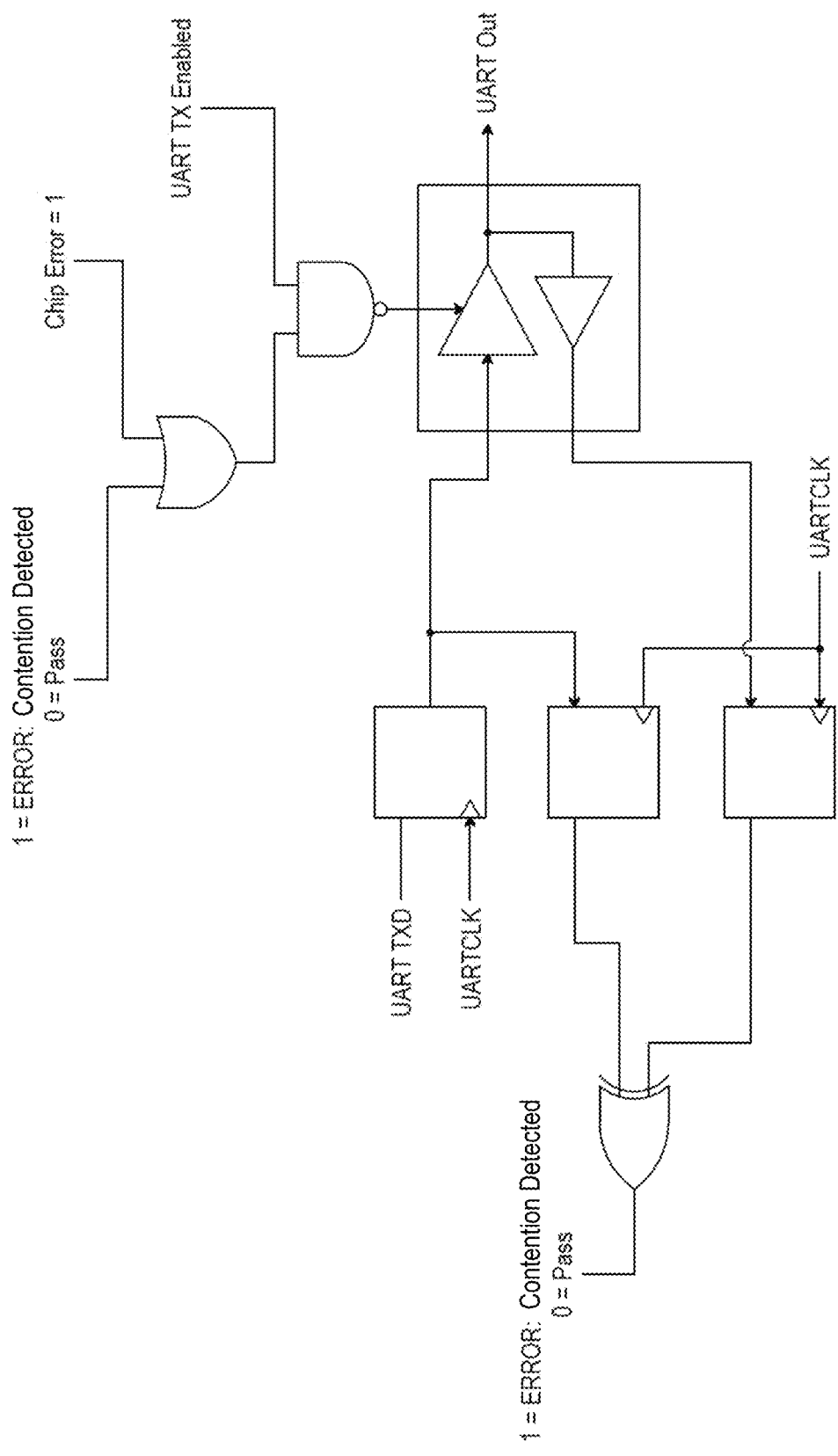
FIG. 16 is an example block diagram illustrating circuitry that performs UART TX pad disabling when bus contention or a chip error is detected in accordance with embodiments of the present disclosure.

FIG. 16 is an example block diagram illustrating circuitry that performs UART TX pad disabling when bus contention or a chip error is detected in accordance with embodiments of the present disclosure. The primary and secondary devices continuously monitor the TX output pad to check for UART TX pad contention, which happens if the primary and the secondary devices simultaneously drive the UART communication link in half-duplex mode. The contention detection is done by comparing the TX pad input signal against a looped back version of the TX pad output signal. If the two signals are different, an error bit is set, and the TX pad is disabled.

Figure 17:
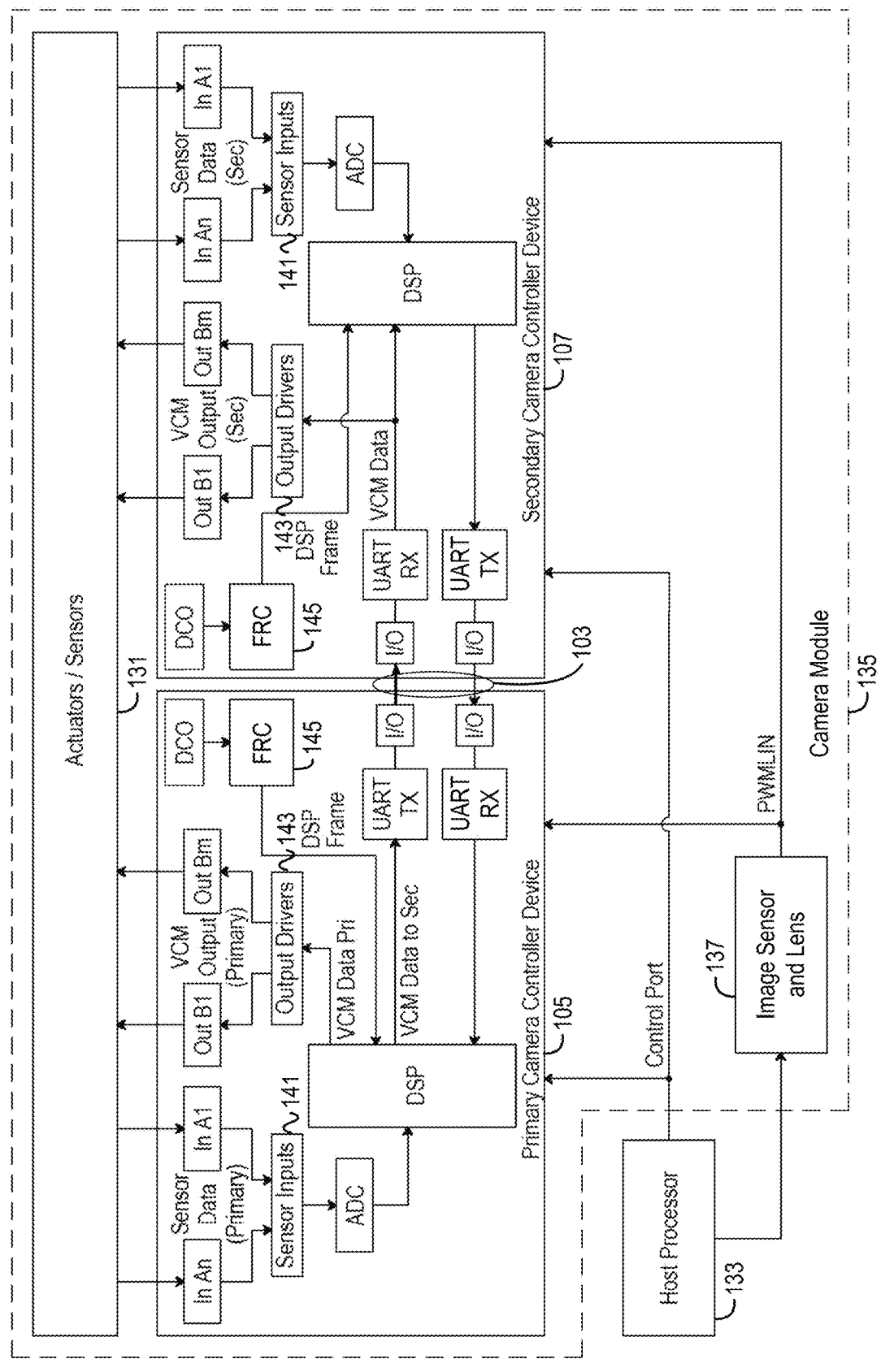
FIG. 17 is an example block diagram illustrating a system in a full-duplex configuration in accordance with embodiments of the present disclosure.

FIG. 17 is an example block diagram illustrating a system 1000 in a full-duplex configuration in accordance with embodiments of the present disclosure. The system 1000 of FIG. 17 is similar in many respects to the system 1000 of FIG. 15. In the system 1000 of FIG. 17, each of the primary camera controller device 105 and the secondary camera controller device 107 includes two I/O pins—one connected to the UART TX pad and the other connected to the UART RX pad, and the communication link 103 includes a pair of wires connecting the respective pairs of I/O pins between the primary camera controller device 105 and the secondary camera controller device 107.

In a full-duplex configuration, two UART links are used, which enables higher transmission bandwidth at the expense of an additional physical connection between the primary and secondary devices. The primary transmit (TX) is connected to the secondary receive (RX). The primary RX is connected to the secondary TX. Since the primary and secondary devices drive separate wires, there is no need to switch between transmit and receive modes, and there is no possibility for bus contention. The primary and secondary UART TX are always enabled. The primary device sets a timeout error flag if the primary device does not receive a response from the secondary device.

To accomplish link health monitoring, the primary device periodically requests status information from the secondary device, which may include device status (device warnings, errors), communication link status (e.g., parity errors or packet sequence errors), and device temperature and voltage measurements. The secondary device checks for parity errors on received data, checks for packet sequence errors, and checks for an 0xFF byte at the end of a packet.

The primary device may make the following status information available to the host: secondary-to-primary timeout error indicator, a secondary-to-primary parity error indicator, a packet sequence error indicator, a status sequence counter, and a packet error counter. The primary device sets the secondary-to-primary timeout error indicator to a true value if a timeout has occurred waiting for a packet from the secondary device. The primary device sets the secondary-to-primary parity error indicator to a true value when the primary device detects a parity error in a received packet from the secondary device. The primary device sets the packet sequence error indicator to a true value if the secondary device sets the Packet Sequence Error bit in the Secondary Status and ACK packet. The status sequence counter is a count of valid status packets received by the primary device from the secondary device. The packet error counter is a count of missed secondary-to-primary packets (e.g., packets for which a timeout occurred), dropped secondary-to-primary packets (e.g., packets for which a parity error was detected), and NACK status packets.

Figure 18:
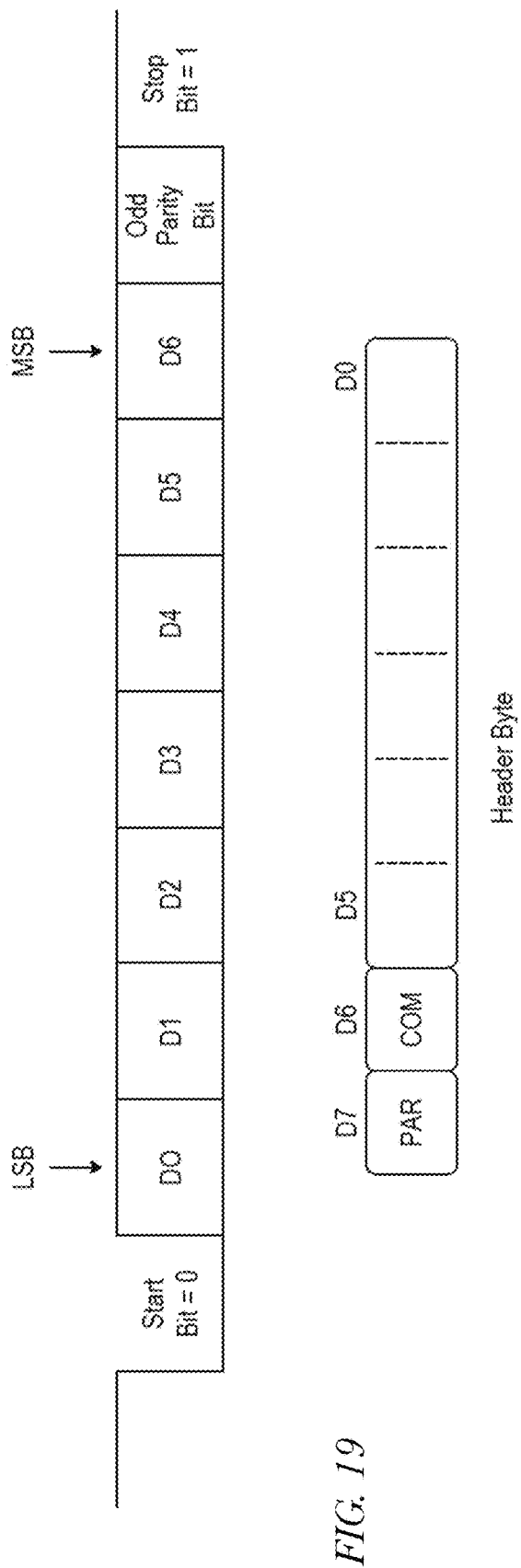
FIG. 18 is example block diagram illustrating UART data bytes framed to include a start bit, seven data bits transmitted least significant bit (LSB) first, an odd parity bit, and a stop bit in accordance with embodiments of the present disclosure.

In one embodiment, the inter-chip communication protocol used by the communication link for data transmission is a UART protocol. Information is sent using UART data bytes framed to comprise: a start bit, 7 data bits transmitted least significant bit (LSB) first, an odd parity bit, and a stop bit, as shown in the example embodiment of FIG. 18.

Figure 19:
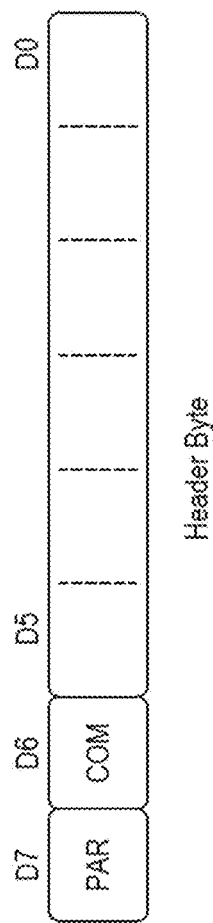
FIG. 19 is a primary device to secondary device packet structure used on the communication link starting with a header byte that specifies the type of packet in accordance with embodiments of the present disclosure.

Embodiments of a packet structure used on the communication link will now be described. In the primary device to secondary device packet structure, all packets start with a header byte that specifies the type of packet, as shown in the example embodiment of FIG. 19. There are two types of packets from primary to secondary: VCM DAC data packet and command packet. The packet type is set with a COM bit in the header byte. COM=0 indicates a VCM DAC data packet type, and COM=1 indicates a command packet.

Figure 20:
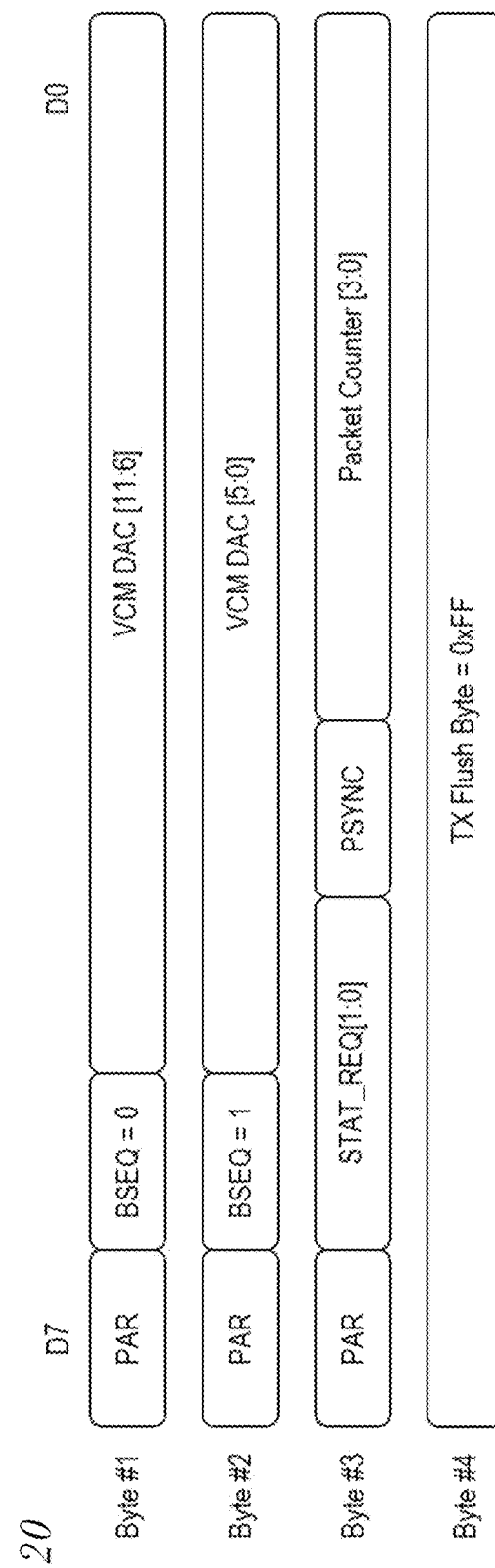
FIG. 20 is an example block diagram of a VCM DAC data packet in accordance with embodiments of the present disclosure.

FIG. 20 is an example block diagram of a VCM DAC data packet in accordance with embodiments of the present disclosure. A description of the bit fields in the packet structure is shown in Table 1 below.

TABLE 1

| | |
|---|---|
| VCM | 12-bit VCM DAC code split into VCM[11:6] and VCM[5:0] and carried in byte 1 and 2, respectively |
| BSEQ | Byte Sequence<br>0 indicates first half (MSB) of VCM DAC code<br>1 indicates second half (LSB) of VCM DAC code |
| PAR | Odd Parity Bit |
| Packet Counter[3:0] | Packet Sequence Counter - Counts from 0 to F and repeats. |
| PSYNC | Packet SYNC - Forces Secondary to Synchronize to the value in Packet Counter[3:0] (typically 0) |
| STAT_REQ[1:0] | Status Request - 2-bit request and Operating Mode<br>00 = Open Loop DAC CODE + Secondary Status and ACK Packet request<br>01 = Closed Loop DAC CODE only, no response requested from Secondary Device<br>10 = Closed Loop DAC CODE + Secondary Status and ACK Packet request<br>11 = Open/Closed Loop DAC CODE + Extended Status and ACK Packet request |
| TX Flush Byte | The TX_FLUSH_BYTE byte is required to indicate that the last valid data byte has successfully been transmitted |

Figure 21:
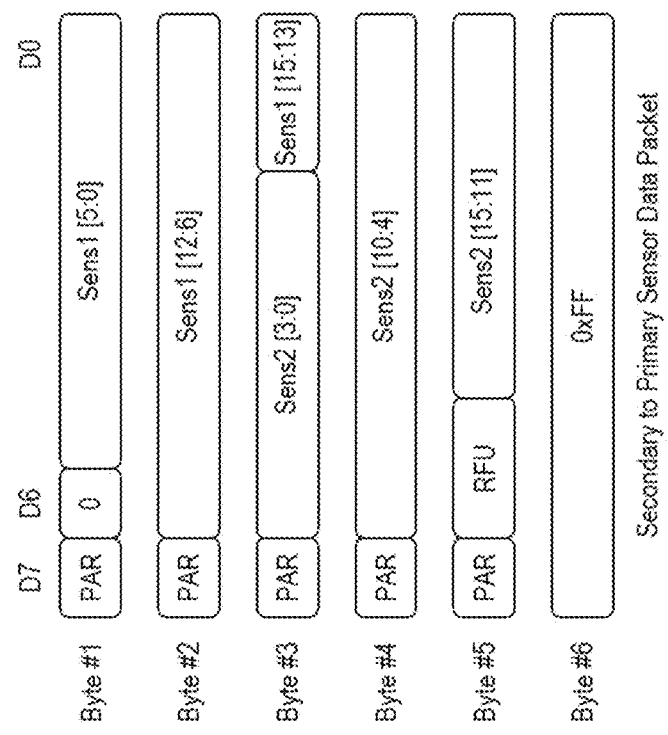
FIG. 21 is an example block diagram of a primary to secondary sensor data packet in accordance with embodiments of the present disclosure.
Figure 22:
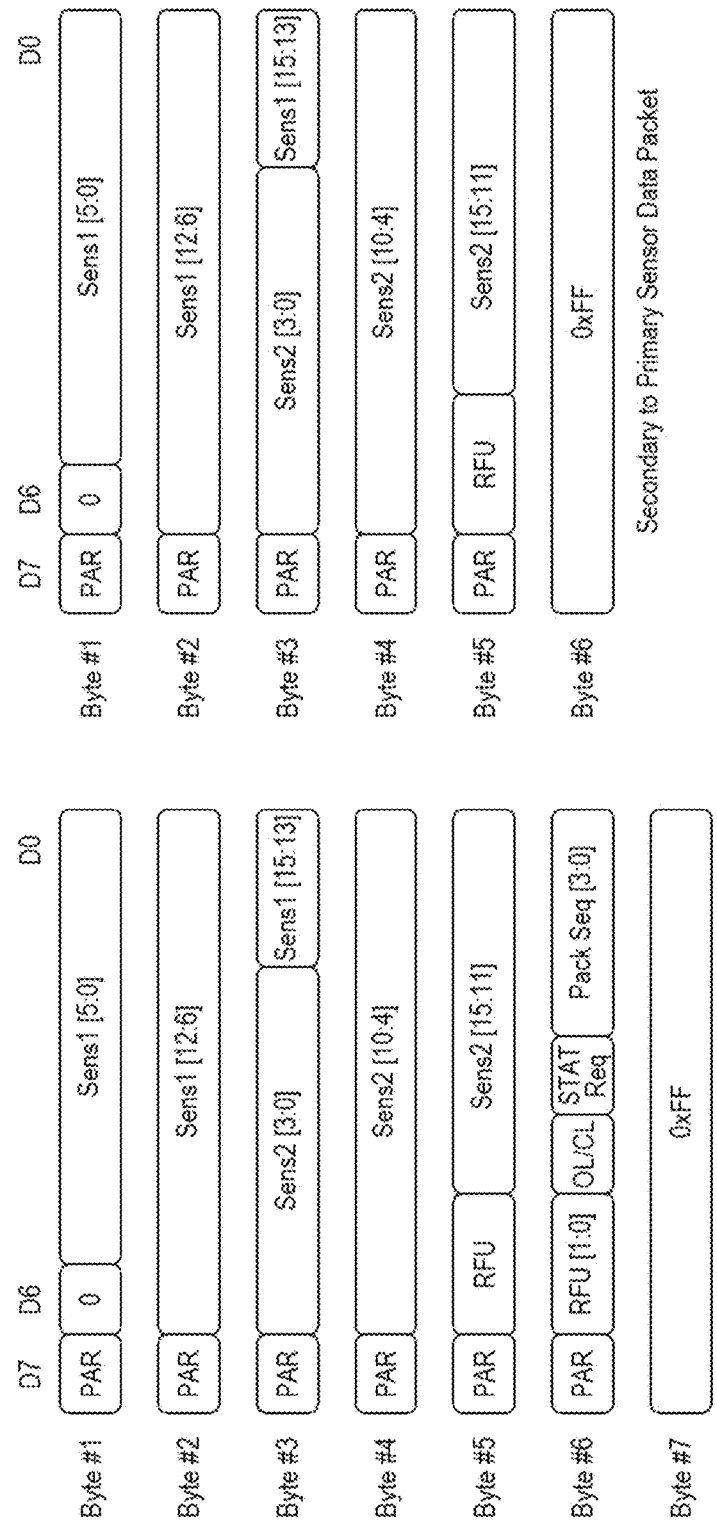
FIG. 22 is an example block diagram of a secondary to primary sensor data packet in accordance with embodiments of the present disclosure.

Sensor data packets are normally used when sensors are enabled on the secondary device. Sensor data may be sent from the primary device to the secondary device (e.g., in the third configuration) and from the secondary device to the primary device (e.g., in the second and third configurations). Primary sensor data may be sent from the primary device to the secondary device, e.g., via the primary to secondary (P2S) sensor data packet shown in the example embodiment of FIG. 21, where it is combined with the secondary device sensor data to produce the VCM DAC data. A secondary to primary (S2P) sensor data packet is similar to the P2S sensor packet, but without the status request byte, as shown in the example embodiment of FIG. 22. In the Figures, fields that are reserved for future use are indicated by "RFU".

Figure 23:
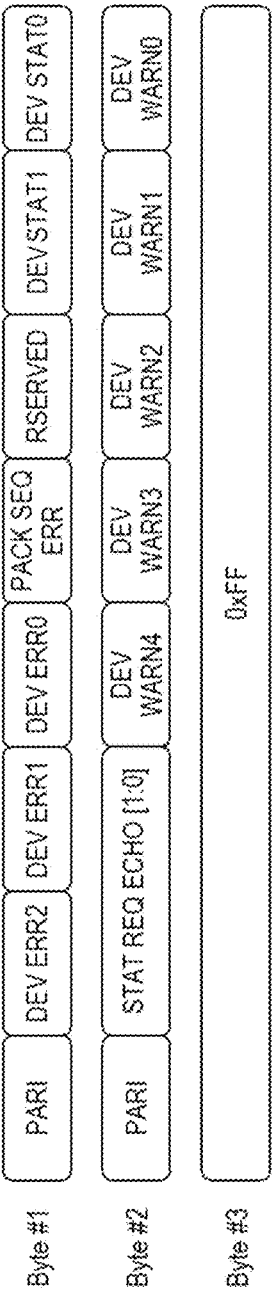
FIG. 23 is an example block diagram of a secondary status packet in accordance with embodiments of the present disclosure.

A secondary device status packet may be sent by the secondary device to the primary device when STAT_REQ in the P2S sensor data packet is set to a true value by the primary device. In one embodiment, the primary device may request the status packet every Nth frame, where N is configurable by the host. In one embodiment, the secondary status packet (also referred to as an ACK packet) has three bytes, an example of which is shown in FIG. 23, and a description of the bit fields in the packet structure is shown in Table 2 below.

Figure 25:
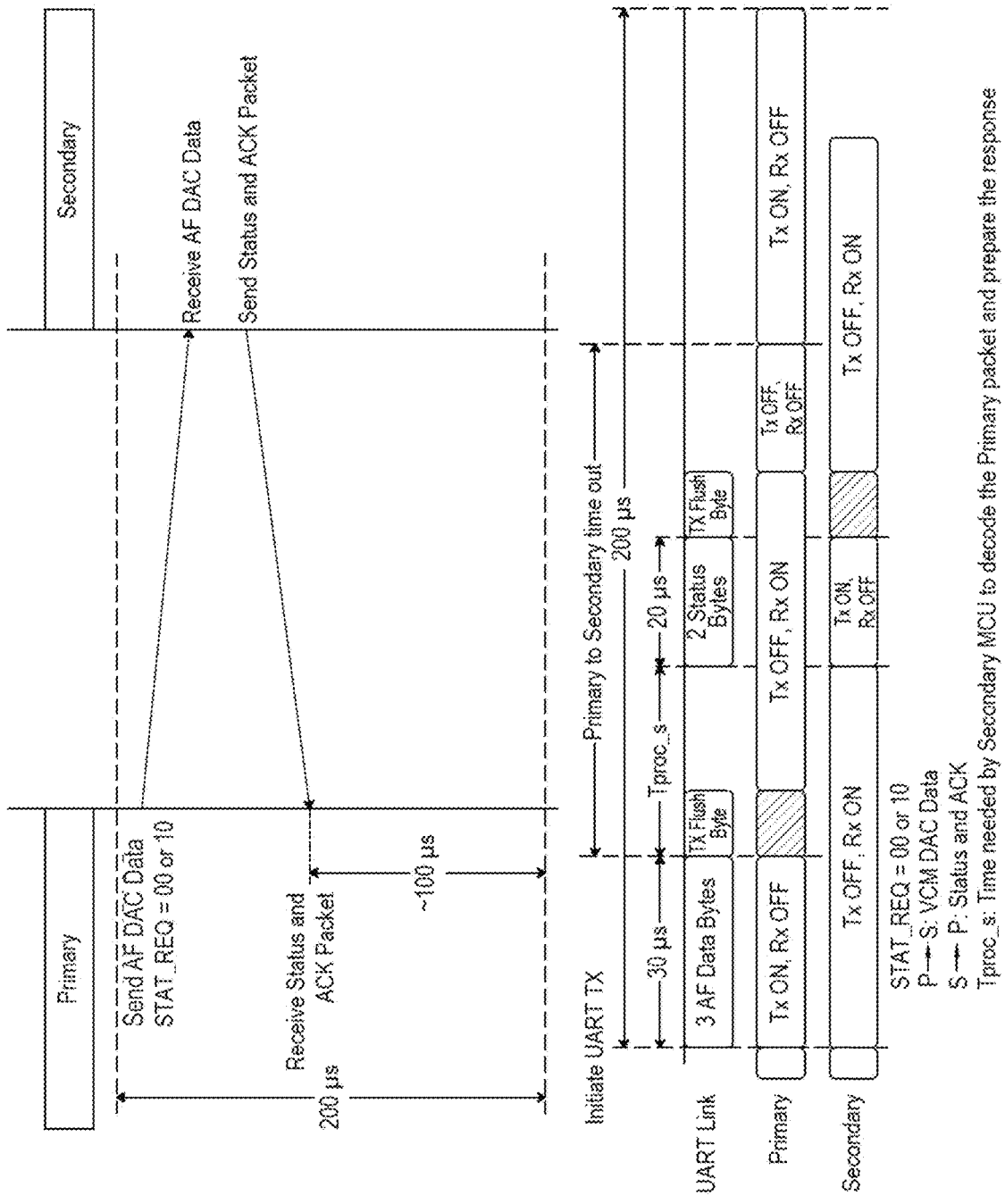
FIG. 25 is an example timing diagram illustrating communication between the primary device and the secondary device when the primary device transmits a VCM DAC data packet that requests status in accordance with embodiments of the present disclosure.

FIG. 25 is an example timing diagram illustrating communication between the primary device and the secondary device when the primary device transmits a VCM DAC data packet with STAT_REQ=1 in accordance with embodiments of the present disclosure. As shown, the primary device sends VCM DAC bytes with STAT_REQ set to 1. For a half-duplex configuration, at the end of TX, the primary device disables TX and enables RX. The secondary device receives the VCM DAC packet and checks if STAT_REQ=1. For a half-duplex configuration, the secondary device enables its TX and disables its RX. The secondary device sends back a secondary status packet, as shown.

Figure 26:
FIG. 26 is an example block diagram illustrating an extended secondary status packet in accordance with embodiments of the present disclosure.

FIG. 26 is an example block diagram illustrating an extended secondary status packet in accordance with

TABLE 2

| Bit Field | Description |
| --- | --- |
| Status 0 | Secondary device status 0 |
| Status 1 | Secondary device status 1 |
| Packet Sequence Error | Secondary Device Packet Count and Packet Counter value in the last packet/recent packets received by the Secondary Device did not match (indicated once per each jump in difference) |
| Warn 0 | Device Warn 0 |
| Warn 1 | Device Warn 1 |
| Warn 2 | Device Warn 2 |
| Warn 3 | Device Warn 3 |
| Warn 4 | Device Warn 4 |
| PAR | Odd Parity |
| STAT_REQ_ECHO[1:0] | Echo of the STAT_REQ[1:0] value received in the preceding VCM DAC Data Packet |
| Error 0 | Device Error 0 |
| Error 1 | Device Error 1 |
| Error 2 | Device Error 2 |
| TX Flush Byte | The TX_FLUSH_BYTE byte is required to indicate that the last valid data byte has successfully been transmitted |

Figure 24:
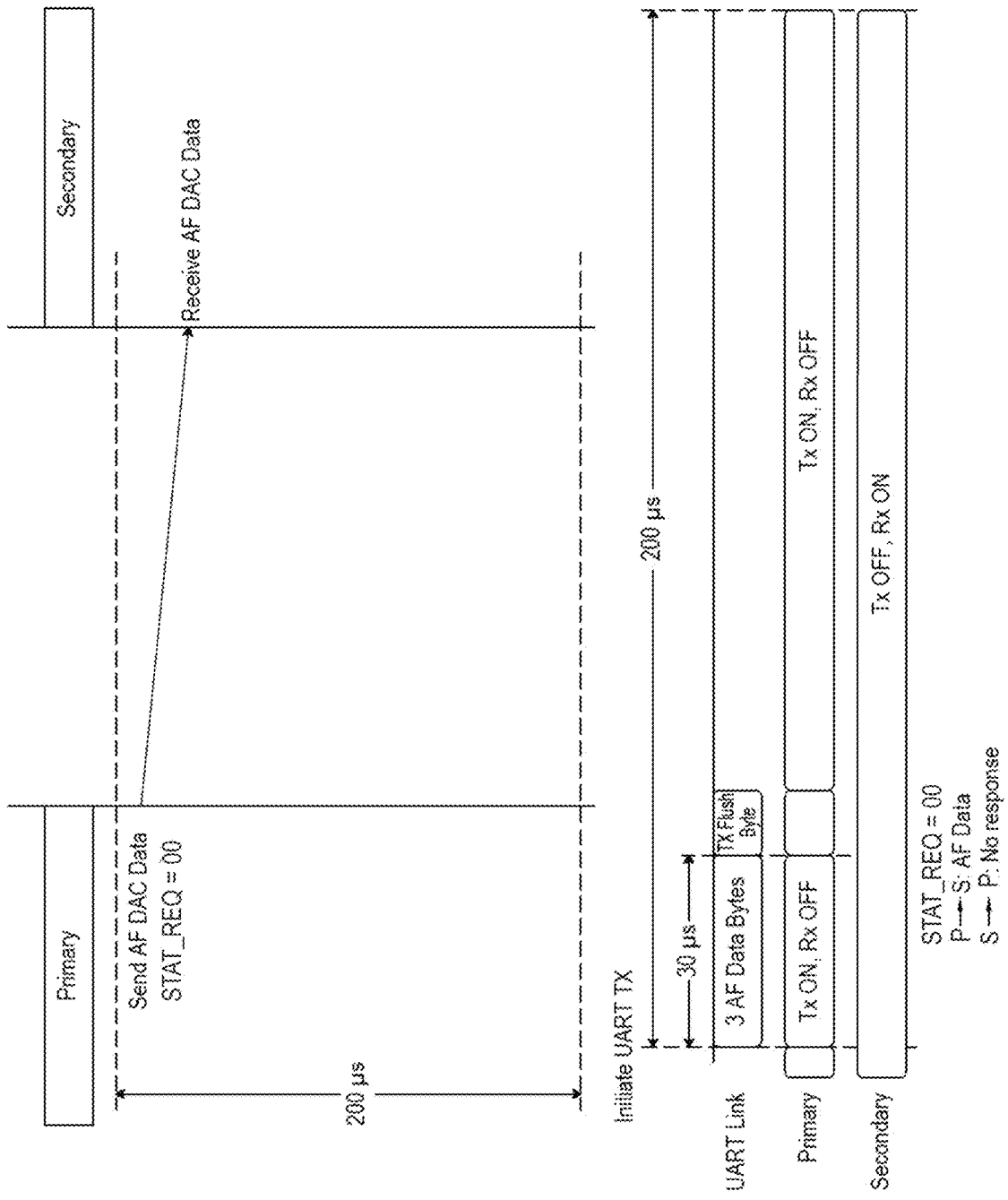
FIG. 24 is an example timing diagram illustrating communication between the primary device and the secondary device when the primary device transmits a VCM DAC data packet that does not request status in accordance with embodiments of the present disclosure.

FIG. 24 is an example timing diagram illustrating communication between the primary device and the secondary device when the primary device transmits a VCM DAC data packet with STAT_REQ=0 in accordance with embodiments of the present disclosure. As shown, for a half-duplex configuration, the primary device enables TX and disables RX. The primary device sends VCM DAC bytes with STAT_REQ=0. At the end of TX, the primary device disables TX and enables RX. The secondary device receives the three bytes and does not respond, since STAT_REQ=0. For the half-duplex configuration, the secondary device keeps its TX disabled and RX enabled since STAT_REQ=0.

embodiments of the present disclosure. Extended secondary status packets, also referred to as extended status and ACK packets, are sent from the secondary device to the primary device when requested by the primary device. The first two bytes of the extended secondary status packet are the same as a secondary status and ACK Packet, and the remaining bytes contain secondary device temperature and voltage data. The extended secondary status packet is nine (9) bytes long for two secondary output drivers and may be extended. A description of the bit fields in the extended secondary status packet is shown in Table 3 below.

TABLE 3

| Bit | Description |
| --- | --- |
| Packet Sequence Error | Secondary Device Packet Count and Packet Counter value in the last packet/recent packets received by the Secondary Device did not match |
| Warn 0 | Device Warn 0 |
| Warn 1 | Device Warn 1 |
| Warn 2 | Device Warn 2 |
| Warn 3 | Device Warn 3 |
| Warn 4 | Device Warn 4 |
| PAR | Odd Parity |
| STAT_REQ_ECHO[1:0] | Echo of the STAT_REQ[1:0] value received in the preceding VCM DAC Data Packet |
| Error 0 | Device Error 0 |
| Error 1 | Device Error 1 |
| Error 2 | Device Error 2 |
| Chip temp | Secondary Device's Internal Temperature measurement |
| Supply Voltage 1_ | Secondary Device's Field supply1 voltage measurement |
| Supply Voltage 1_ | Secondary Device's supply2 voltage measurement |
| Output Voltage 1 | Secondary Device's B1 driver output voltage measurement |

TABLE 3-continued

| Bit | Description |
| --- | --- |
| Output Voltage 2 | Secondary Device's B2 driver output voltage measurement |
| TX Flush Byte | The TX_FLUSH_BYTE byte is required to indicate that the last valid data byte has successfully been transmitted |

FIG. 27 is an example block diagram illustrating a primary to secondary command packet header in accordance with embodiments of the present disclosure. The primary device sends command packets to the secondary device to request register reads and writes. Command packets start with the header byte in which the COM bit=1, as shown in FIG. 27. A description of the command field (COM[2:0]) values in the primary to secondary command packet header are shown in Table 4 below.

TABLE 4

| Command | Description | Comments |
| --- | --- | --- |
| 0 | Reserved | Reserved |
| 1 | 16-bit Read | 16-bit Secondary Read |
| 2 | 32-bit register Read | 32-bit Secondary Read |
| 3 | 16-bit Write | 16-bit Secondary Write |
| 4 | 32-bit Write | 32-bit Secondary Read |
| 5 . . . 7 | Reserved | Reserved |

FIG. 28 is an example block diagram illustrating a secondary to primary response packet header in accordance with embodiments of the present disclosure. The secondary to primary response packets may be a response to a register read command or a response to a register write command. The secondary to primary response packet starts with a header byte, shown in FIG. 28, that contains a type field that indicates the type of information contained in the secondary to primary response packet. A description of the type field (Type[2:0]) values in the secondary to primary response packet header are shown in Table 5 below.

TABLE 5

| Type | Description |
| --- | --- |
| 0 | Reserved |
| 1 | 16-bit Read |
| 2 | 32-bit Read |
| 3 | 16-bit Write |
| 4 | 32-bit Write |
| 5-7 | Reserved |

Figure 30:
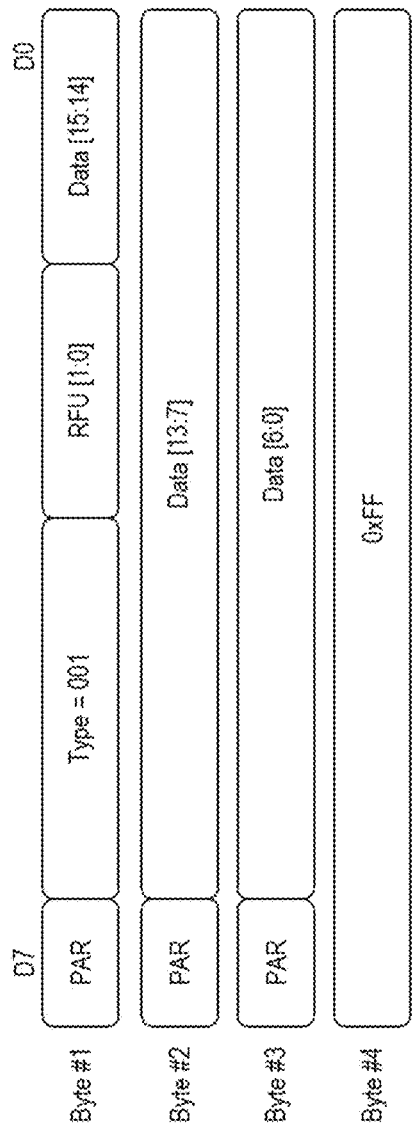
FIG. 30 is an example block diagram illustrating a secondary response packet to a 16-bit register read command packet in accordance with embodiments of the present disclosure.

FIG. 29 is an example block diagram illustrating a primary to secondary 16-bit register read command packet in accordance with embodiments of the present disclosure. The primary device may request a 16-bit register read by sending a 16-bit register read command with the COM bit set to 1 followed by three bytes with the register address, as shown. The 16-bit register read command packet may be used to read secondary device and link status, as well as other data such as voltage and temperature measurements. Once the secondary device receives the 16-bit register read command, the secondary device will respond with a 4-byte secondary response packet, an example block diagram of which is shown in FIG. 30, that includes data and a type field to indicate to the primary device the type of response.

Figure 31:
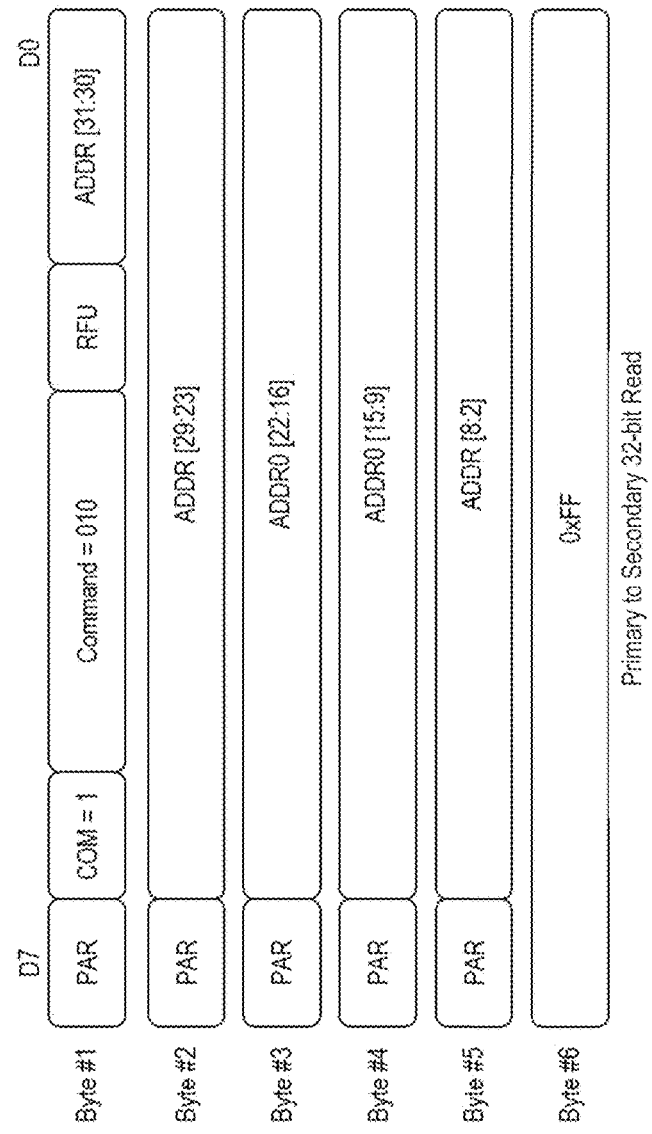
FIG. 31 is an example block diagram illustrating a primary to secondary 32-bit register read command packet in accordance with embodiments of the present disclosure.
Figure 32:
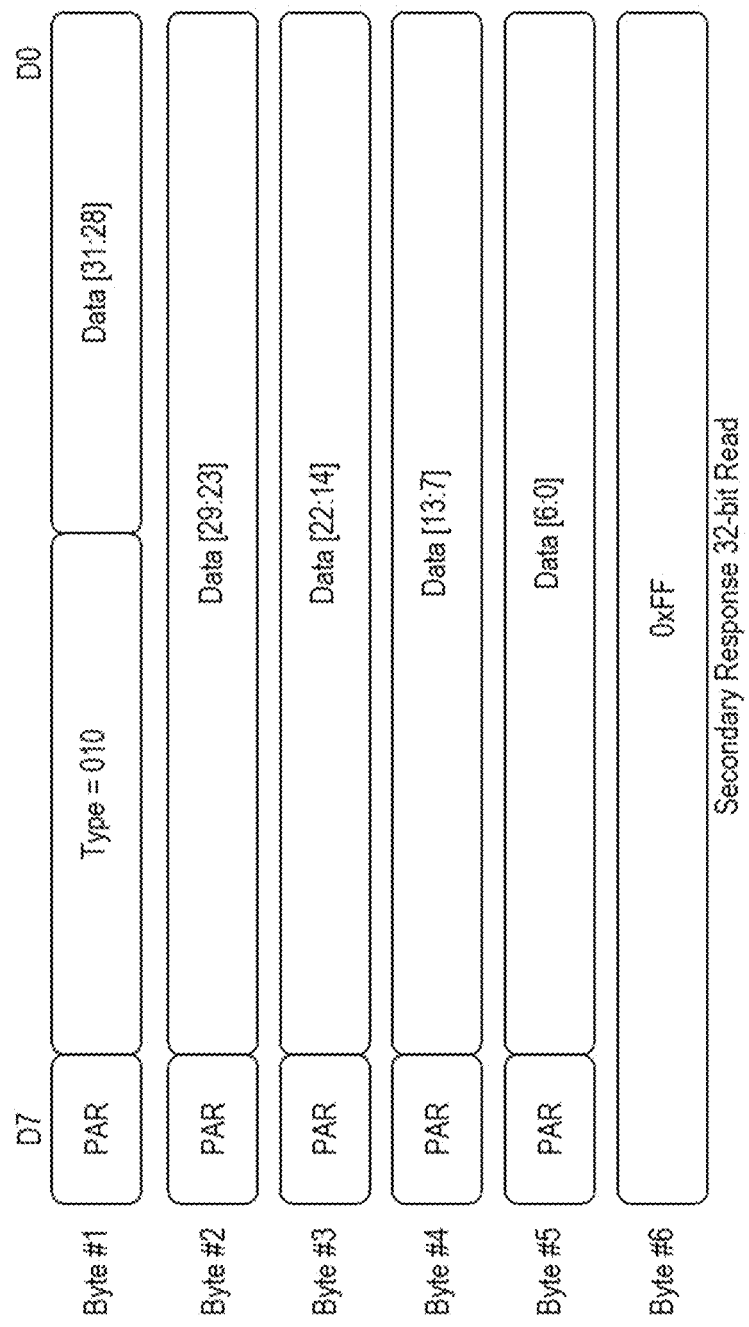
FIG. 32 is an example block diagram illustrating a secondary response packet to a 32-bit register read command packet in accordance with embodiments of the present disclosure.

FIG. 31 is an example block diagram illustrating a primary to secondary 32-bit register read command packet in accordance with embodiments of the present disclosure. The primary device may request to read any secondary device register or memory location by sending a 32-bit register read command with the COM bit set to 1 followed by five bytes with the register address, as shown. Once the secondary device receives the 32-bit register read command, the secondary device responds back with a 6-byte secondary response packet, an example block diagram of which is shown in FIG. 32, that includes data and a type field to indicate to the primary device the type of response.

Figures 33, 34:
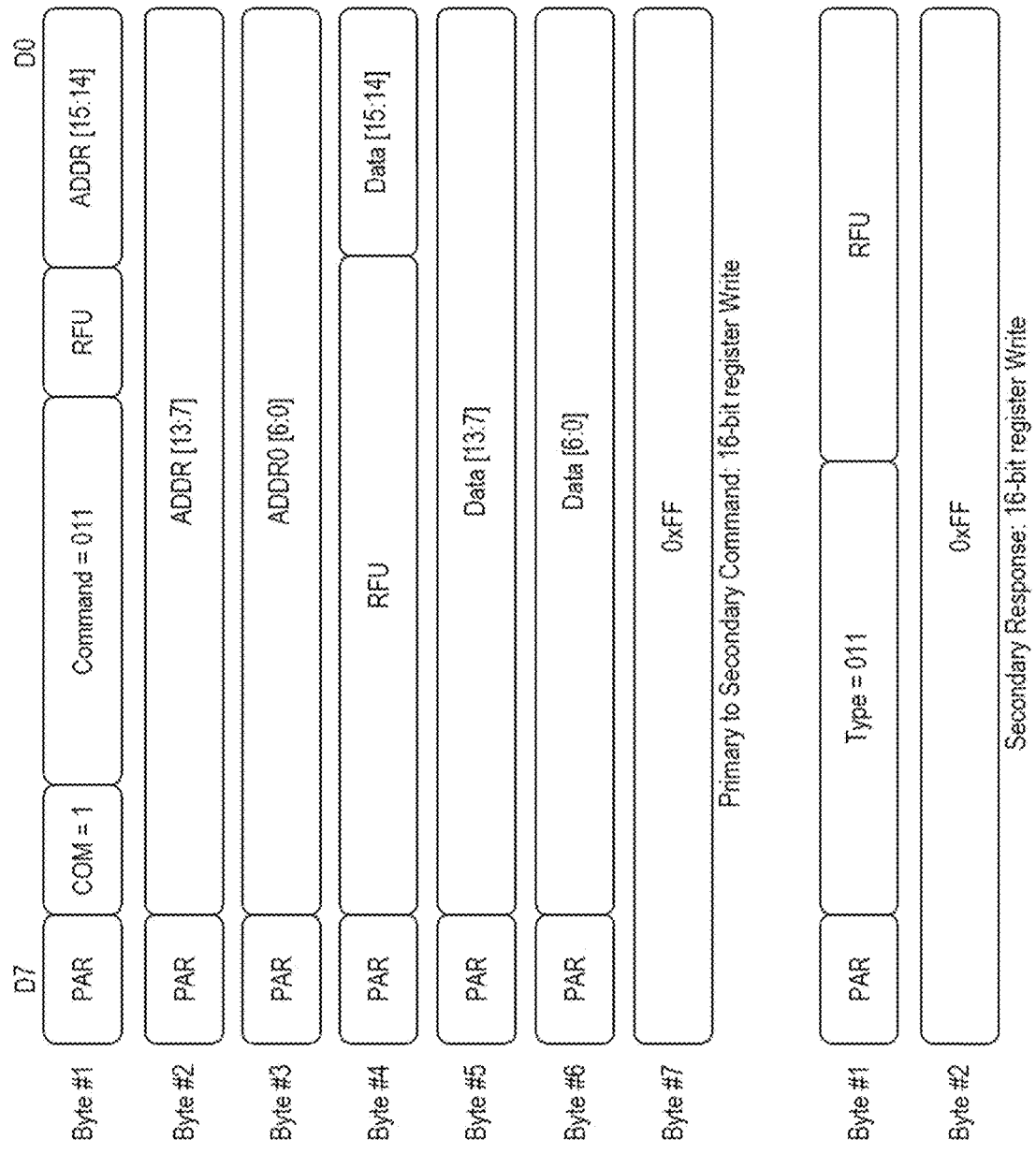
FIG. 33 is an example block diagram illustrating a primary to secondary 16-bit register write command packet in accordance with embodiments of the present disclosure.
FIG. 34 is an example block diagram illustrating an ACK packet to a 16-bit register write command packet in accordance with embodiments of the present disclosure.

FIG. 33 is an example block diagram illustrating a primary to secondary 16-bit register write command packet in accordance with embodiments of the present disclosure. The primary device may request a 16-bit register write by sending a 16-bit register write command with the COM bit set to 1 followed by a 16-bit address, as shown. Once the write command is received, the secondary device responds with a two-byte ACK packet, an example block diagram of which is shown in FIG. 34, to indicate that the write was successful.

Figure 35:
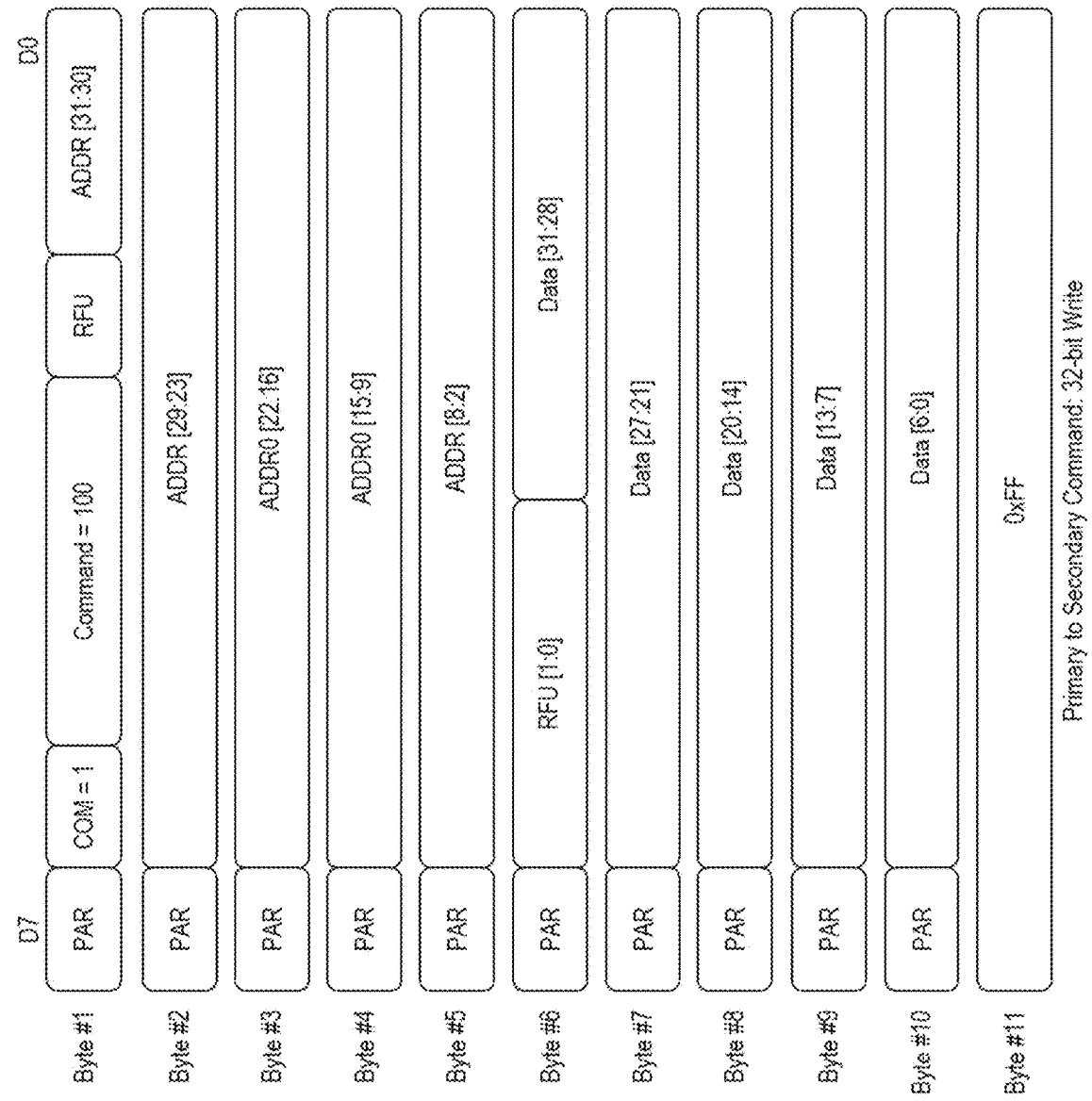
FIG. 35 is an example block diagram illustrating a primary to secondary 32-bit register write command packet in accordance with embodiments of the present disclosure.
Figure 36:
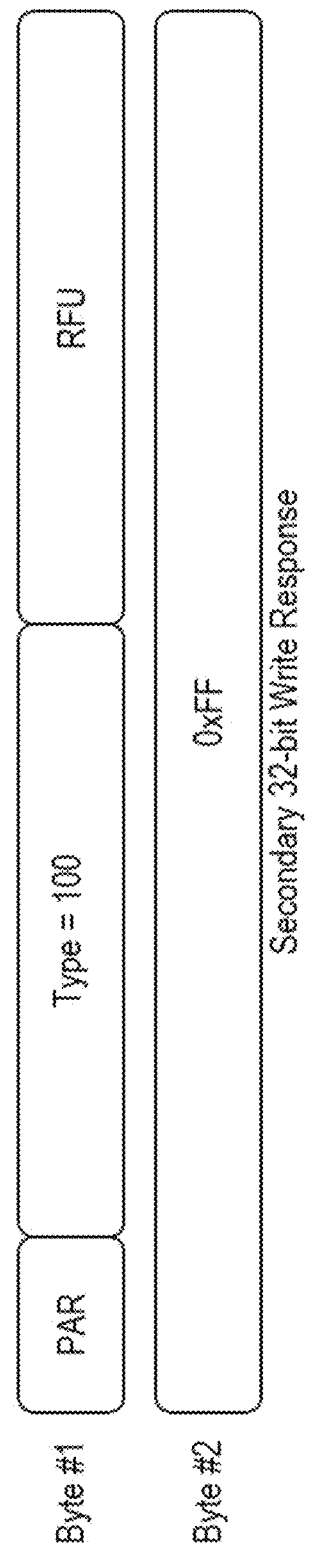
FIG. 36 is an example block diagram illustrating an ACK packet to a 32-bit register write command packet in accordance with embodiments of the present disclosure.

FIG. 35 is an example block diagram illustrating a primary to secondary 32-bit register write command packet in accordance with embodiments of the present disclosure. The primary device may request a 32-bit register or memory write by sending a 32-bit register write command with the COM bit set to 1 followed by a 32-bit address and followed by 32-bit write data, as shown. Once the write command is received, the secondary device responds with a two-byte ACK packet, an example block diagram of which is shown in FIG. 36, to indicate that the write was successful.

In one embodiment, the host processor may configure and control the secondary camera controller device by "tunneling" through the primary camera controller device to the secondary camera controller device. The host processor may accomplish the tunneling as follows. The host processor may send a command to the primary camera controller device to write a register/memory of the secondary camera controller device; in response, the primary camera controller device sends one or more register/memory write packets to the secondary camera controller device based on the command received from the host processor. Additionally, the host processor may send a command to the primary camera controller device to read a register/memory of the secondary camera controller device; in response, the primary camera controller device sends one or more register/memory read packets to the secondary camera controller device based on the command received from the host processor; the primary camera controller device receives from the secondary camera controller device the data in register/memory and returns the received data to the host processor.

Although embodiments have been described for use in controlling actuators that are voice coil motors of a camera, other embodiments are contemplated in which the primary/secondary device combination is used to control other types of actuators, e.g., stepper motors, piezo-electric motors, and the system may be viewed as an expression of a servo loop for performing the various functions described above. Additionally, various types of sensors may be employed to provide the sensor data, e.g., Hall sensors or other type of magnetic sensors may provide position data, and various temperature detection devices may be employed to provide temperature data. Finally, although embodiments are described in which the communication link may be a UART type communication link, other embodiments are contemplated in which other types of communication links between the primary camera controller device and the secondary camera controller devices are used, such as a point-to-point RS232 asynchronous serial link, a multi-drop RS485 asynchronous serial link, an Inter-Integrated Circuit (I2C) multi-drop synchronous link, an Serial Peripheral Interface (SPI) multi-drop synchronous link, an Ethernet link, a Universal Serial Bus (USB) link, an High-Definition Multi-Media Interface (HDMI) link, and a Fiber Channel link.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein.

For example, communication of (synchronized) updates between primary device and secondary device may be through a variety of communication types, such as full-duplex communication or half-duplex communication. Such communication may support robustness of data transport, additional configurations, additional sensors and/or additional processing on the secondary device and the communicating by the secondary device of such information that at least includes the health of the secondary device and/or other status or information relevant to the primary device.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A system for using actuators to control an image sensor and/or lens based on sensor data received from position sensors and based on position information for the image sensor and/or lens received from a host processor, comprising:
   a primary camera controller device;
   at least one secondary camera controller device; and
   at least one communication link connecting the primary camera controller device and the at least one secondary camera controller device;
   wherein the primary camera controller device is configured to:
      process the received sensor data and the received position information to generate control data;
      send a secondary portion of the control data to the secondary camera controller device via the communication link; and
      drive a primary portion of the control data to the actuators; and
   wherein the secondary camera controller device is configured to drive the received secondary portion of the control data to the actuators concurrently with the primary camera controller device driving the primary portion of the control data to the actuators.

2. The system of claim 1,
   wherein the secondary camera controller device is further configured to:
      receive secondary sensor data from the position sensors; and
      send the received secondary sensor data to the primary camera controller device via the communication link; and
   wherein the primary camera controller device is further configured to:
      process the received primary and secondary sensor data and the received position information to generate the control data.

3. The system of claim 1,
   wherein each of the primary and secondary camera controller devices includes a respective transmit pad that drives the communication link; and
   wherein each of the primary and secondary camera controller devices is configured to:
      monitor the respective transmit pad for contention caused when the primary and secondary camera controller devices concurrently drive the respective transmit pad in a half-duplex mode; and
      disable the transmit pad in response to detecting the contention.

4. The system of claim 3,
   wherein each of the primary and secondary camera controller devices is configured to monitor the respective transmit pad for contention by comparing an input signal received on the transmit pad from the other camera controller device with a looped-back version of an output signal driven on the transmit pad by the respective camera controller device.

5. The system of claim 1,
   wherein each of the primary and secondary camera controller devices is configured to disable the communication link in response to detecting an over temperature condition or an expiration of a watch dog timer with respect to the communication link.

6. The system of claim 1,
wherein the primary camera controller device is configured to periodically request status information from the secondary camera controller device via the communication link comprising one or more of:
  status of the secondary camera controller device;
  status of the communication link; and
  temperature and/or voltage measurements of the secondary camera controller device.

7. The system of claim 1,
wherein the secondary camera controller device is configured to check for one or more of:
  a parity error on data received from the primary camera controller device; and
  a packet sequence error on packets received from the primary camera controller device.

8. The system of claim 1,
wherein the primary camera controller device is configured to report to the host processor that a packet expected from the secondary camera controller device timed out.

9. The system of claim 1,
wherein the primary camera controller device is configured to report to the host processor that a packet received from the secondary camera controller device has a parity error.

10. The system of claim 1,
wherein the primary camera controller device is configured to report to the host processor that the secondary camera controller device indicated a packet sequence error with respect to packets sent by the primary camera controller device to the secondary camera controller device.

11. The system of claim 1,
wherein the primary camera controller device is configured to report to the host processor a count of valid status packets received from the secondary camera controller device.

12. The system of claim 1,
wherein the primary camera controller device is configured to report to the host processor a count of:
  missed packets from the secondary camera controller device to the primary camera controller device;
  dropped packets from the secondary camera controller device to the primary camera controller device; and
  negative acknowledgement (NACK) status packets.

13. A method for using actuators to control an image sensor and/or lens based on sensor data received from position sensors and based on position information for the image sensor and/or lens received from a host processor, comprising:
  processing, by a primary camera controller device, the received sensor data and the received position information to generate control data;
  sending, by the primary camera controller device, a secondary portion of the control data to at least one secondary camera controller device via at least one communication link connecting the primary camera controller device and the at least one secondary camera controller device;
  driving, by the primary camera controller device, a primary portion of the control data to the actuators; and
  driving, by the secondary camera controller device, the received secondary portion of the control data to the actuators concurrently with the primary controller device driving the primary portion of the control data to the actuators.

14. The method of claim 13, further comprising:
  receiving, by the secondary camera controller device, secondary sensor data from the position sensors;
  sending, by the secondary camera controller device, the received secondary sensor data to the primary camera controller device via the communication link; and
  processing, by the primary camera controller device, the received primary and secondary sensor data and the received position information to generate the control data.

15. The method of claim 13, further comprising:
wherein each of the primary and secondary camera controller devices includes a respective transmit pad that drives the communication link; and
by each of the primary and secondary camera controller devices:
  monitoring the respective transmit pad for contention caused when the primary and secondary camera controller devices concurrently drive the respective transmit pad in a half-duplex mode; and
  disabling the transmit pad in response to detecting the contention.

16. The method of claim 15,
wherein said monitoring the respective transmit pad for contention comprises:
  comparing an input signal received on the transmit pad from the other camera controller device with a looped-back version of an output signal driven on the transmit pad by the respective camera controller device.

17. The method of claim 13, further comprising:
by each of the primary and secondary camera controller devices:
  disabling the communication link in response to detecting an over temperature condition or an expiration of a watch dog timer with respect to the communication link.

18. The method of claim 13, further comprising:
periodically requesting, by the primary camera controller device, status information from the secondary camera controller device via the communication link comprising one or more of:
  status of the secondary camera controller device;
  status of the communication link; and
  temperature and/or voltage measurements of the secondary camera controller device.

19. The method of claim 13, further comprising:
checking, by the secondary camera controller device, for one or more of:
  a parity error on data received from the primary camera controller device; and
  a packet sequence error on packets received from the primary camera controller device.

20. The method of claim 13, further comprising:
reporting, by the primary camera controller device, to the host processor that a packet expected from the secondary camera controller device timed out.

21. The method of claim 13, further comprising:
reporting, by the primary camera controller device, to the host processor that a packet received from the secondary camera controller device has a parity error.

22. The method of claim 13, further comprising:
reporting, by the primary camera controller device, to the host processor that the secondary camera controller device indicated a packet sequence error with respect to packets sent by the primary camera controller device to the secondary camera controller device.

23. The method of claim 13, further comprising:
reporting, by the primary camera controller device, to the host processor a count of valid status packets received from the secondary camera controller device.

24. The method of claim 13, further comprising:
reporting, by the primary camera controller device, to the host processor a count of:
   missed packets from the secondary camera controller device to the primary camera controller device;
   dropped packets from the secondary camera controller device to the primary camera controller device; and
   negative acknowledgement (NACK) status packets.

\* \* \* \* \*